(12) United States Patent
Liao

(10) Patent No.: US 8,661,932 B2
(45) Date of Patent: Mar. 4, 2014

(54) SPEED CONTROL DEVICE FOR SPEED CHANGING DEVICE OF BICYCLE

(75) Inventor: Chia-Wei Liao, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 252 days.

(21) Appl. No.: 13/047,940

(22) Filed: Mar. 15, 2011

(65) Prior Publication Data
US 2012/0234125 A1 Sep. 20, 2012

(51) Int. Cl.
*B62M 25/04* (2006.01)
*B62K 23/06* (2006.01)

(52) U.S. Cl.
USPC ........................................ 74/502.2

(58) Field of Classification Search
USPC ........ 74/502.2, 504, 505, 506, 507, 488, 489, 74/473.14, 473.15
IPC .......................... B62K 23/02,23/06; F16C 1/10
See application file for complete search history.

(56) References Cited

U.S. PATENT DOCUMENTS

| | | | | |
|---|---|---|---|---|
| 3,972,247 | A * | 8/1976 | Armstrong | 74/489 |
| 5,213,005 | A * | 5/1993 | Nagano | 74/502.2 |
| 5,287,766 | A | 2/1994 | Nagano | 74/502.2 |
| 5,361,645 | A | 11/1994 | Feng et al. | 74/502.2 |
| 5,479,776 | A | 1/1996 | Romano | 74/502.2 |
| 6,220,111 | B1 | 4/2001 | Chen | 74/473.15 |
| 7,617,920 | B2 * | 11/2009 | Kanehisa | 192/64 |
| 2010/0288070 | A1* | 11/2010 | Fukao | 74/502.2 |
| 2011/0079103 | A1* | 4/2011 | Kususe et al. | 74/502.2 |
| 2011/0132123 | A1* | 6/2011 | Tsai et al. | 74/473.14 |

* cited by examiner

*Primary Examiner* — James Pilkington
*Assistant Examiner* — Brian McGovern
(74) *Attorney, Agent, or Firm* — Alan Kamrath; Kamrath IP Lawfirm, P.A.

(57) ABSTRACT

A speed control device, which is adapted to be used in connection with a derailleur type bicycle or an internal gear hub type bicycle, has one operation mode for up-shifting the speed and another operation mode for down-shifting the speed. The two operation modes can be affected by an operation lever, with the operation lever pivoted in a second rotation direction for the up-shifting operation and in a first rotation direction for the down-shifting operation.

18 Claims, 25 Drawing Sheets

US 8,661,932 B2

SPEED CONTROL DEVICE FOR SPEED CHANGING DEVICE OF BICYCLE

BACKGROUND OF THE INVENTION

1. Field of the Invention

The present invention relates generally to a speed control device, and more particularly, this invention relates to a speed control device which facilitates the operation of a speed changing device of a bicycle.

2. Description of the Related Art

U.S. Pat. Nos. 5,213,005; 5,361,645; 5,479,776 and 6,220,111 disclose a speed control device including one operation lever that a user can use to up-shift the speed and another operation lever to down-shift the speed. However, such speed control device has the disadvantage that the operator could easily operate the wrong lever in a speed change operation.

U.S. Pat. No. 5,287,766 shows a speed control device which utilizes an operation lever for up-shifting and down-shifting the speed. The speed control device is particularly mounted on straight handlebar type bicycles. In spite of the advantage of the speed control device employing one operation lever as discussed in the proceeding, it is believed that there is a need for improvement in the field of speed control devices and more specifically in curved handlebar type bicycles.

The present invention is, therefore, intended to obviate or at least alleviate the problems encountered in the prior art.

SUMMARY OF THE INVENTION

According to the present invention, the main purpose is to provide a speed control device, adapted to be used in connection with a derailleur type bicycle or an internal gear hub type bicycle, having one operation mode for up-shifting the speed and another operation mode for down-shifting the speed. The two operation modes can be affected by an operation lever, with the operation lever pivoted in a second rotation direction for the up-shifting operation and in a first rotation direction for the down-shifting operation.

The control assembly is adapted to effect multiple speed changes in one stroke of the second engaging mechanism.

DETAILED DESCRIPTION OF THE PREFERRED EMBODIMENT EMBODIMENTS

Figure 1:
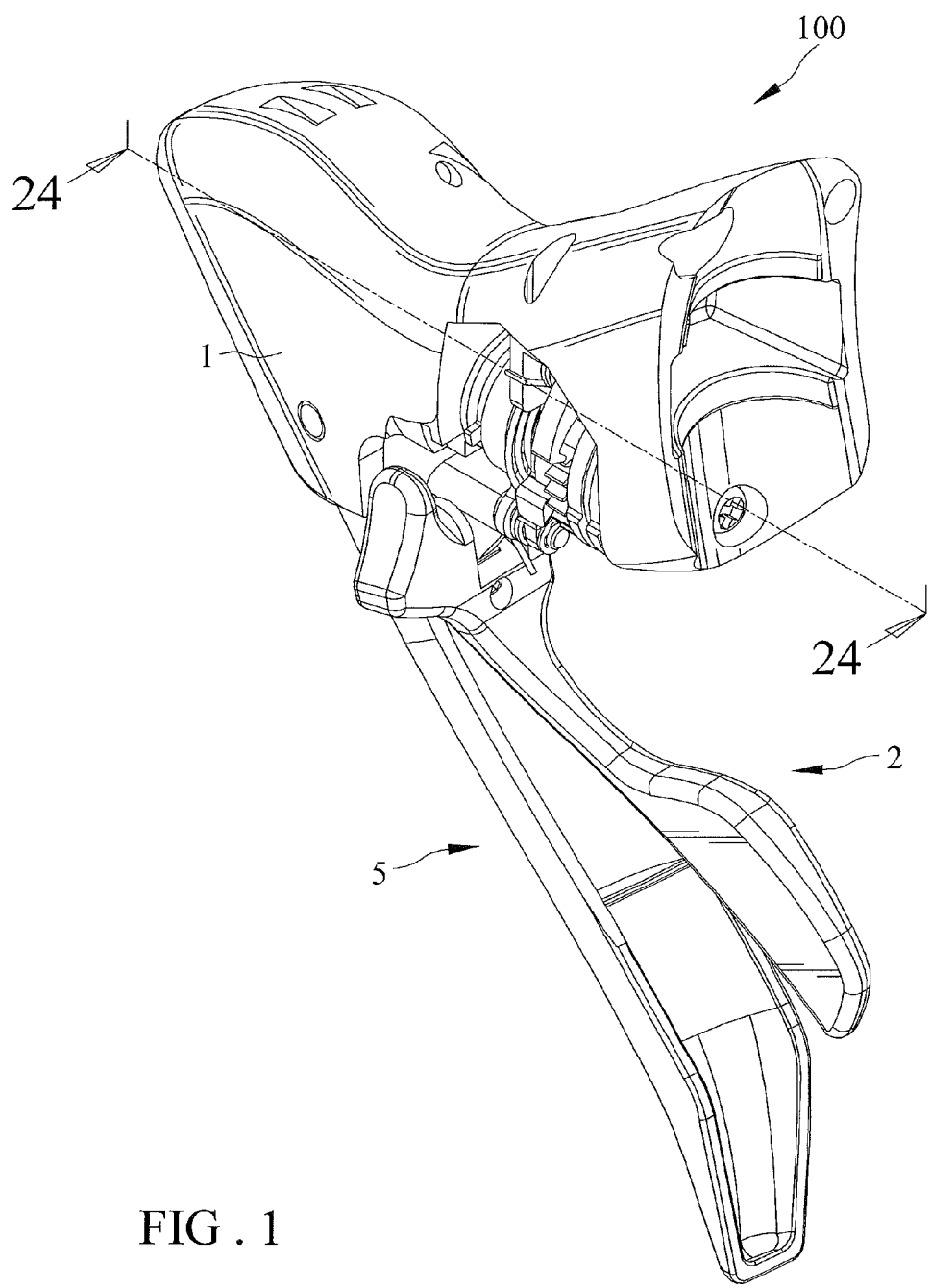
FIG. 1 is a perspective view of a speed control device according to the present invention.
Figure 2:
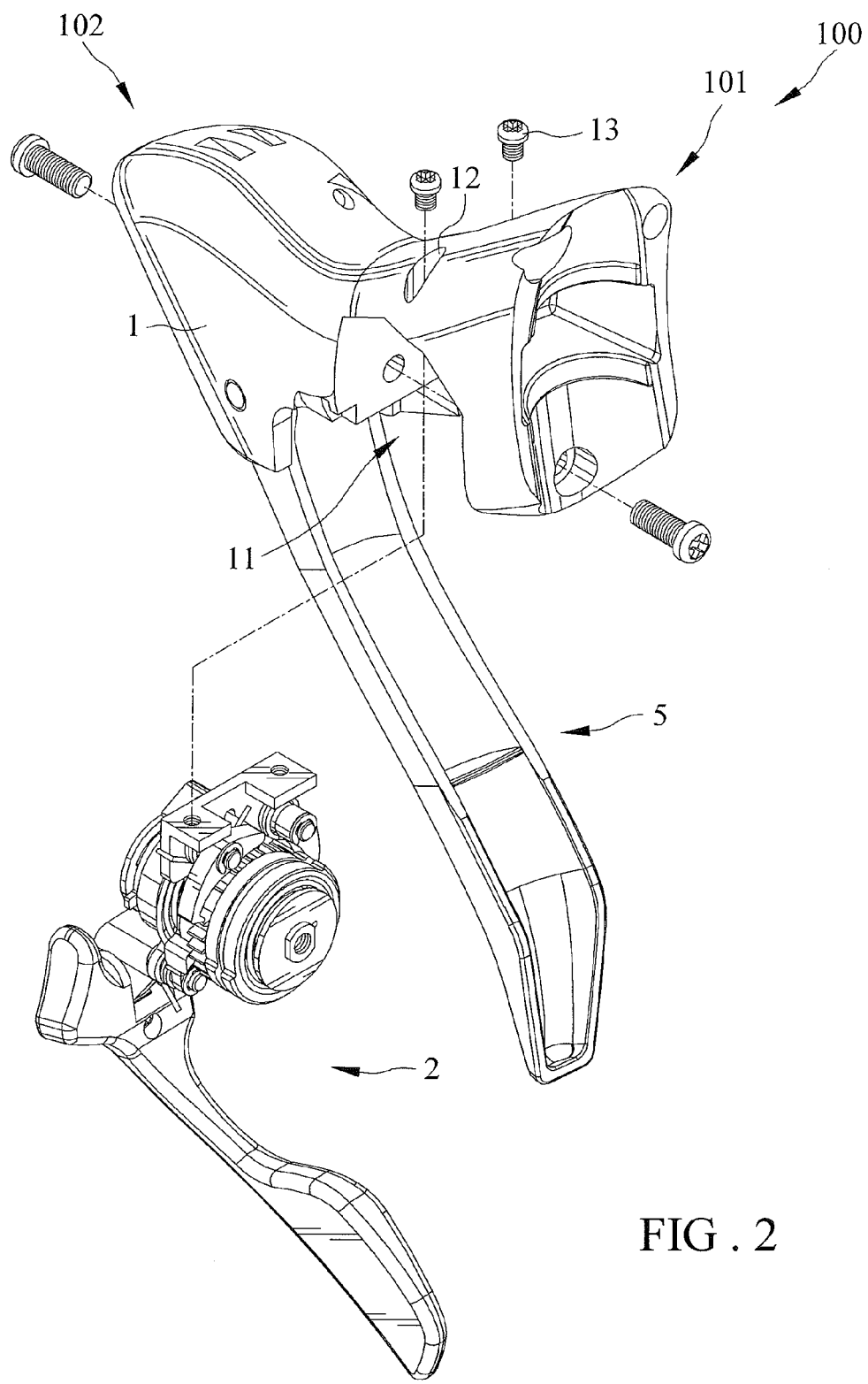
FIG. 2 is an exploded perspective view of the speed control device of FIG. 1.
Figure 3:
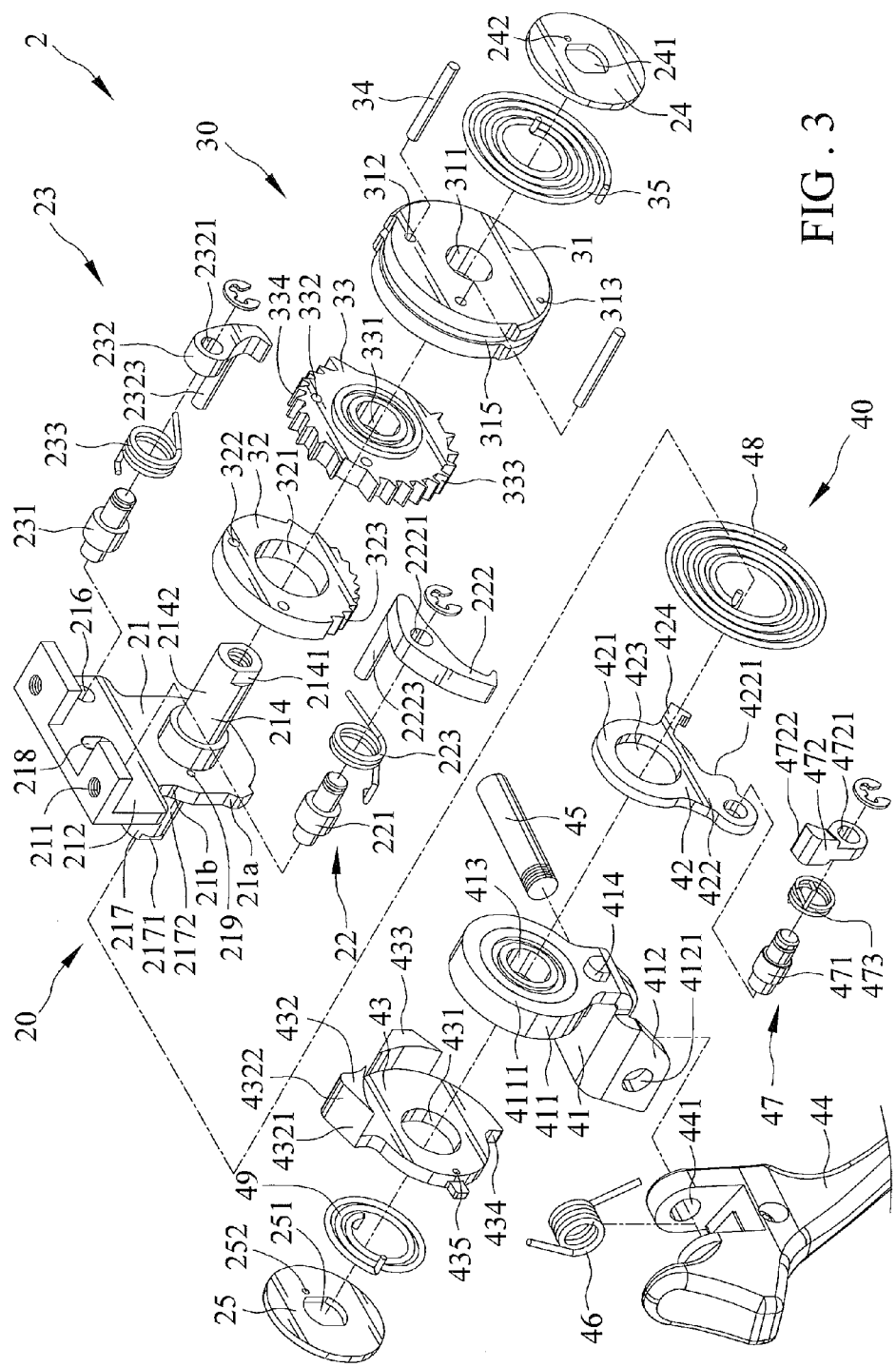
FIG. 3 is an exploded perspective view of a control assembly embodying the present invention.
Figure 4:
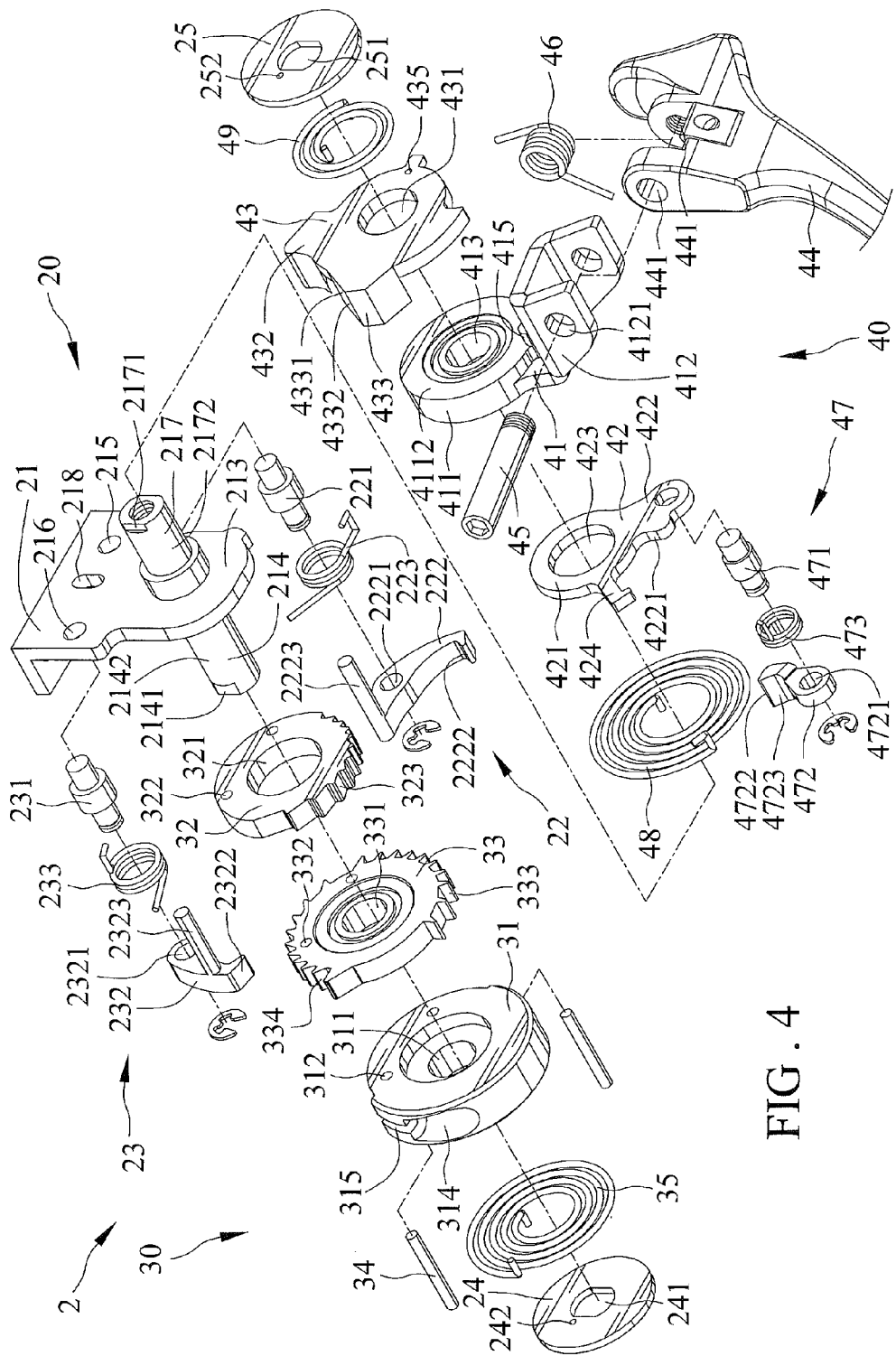
FIG. 4 is another exploded perspective view of the control assembly taken from a different angle than that of FIG. 3.
Figure 5:
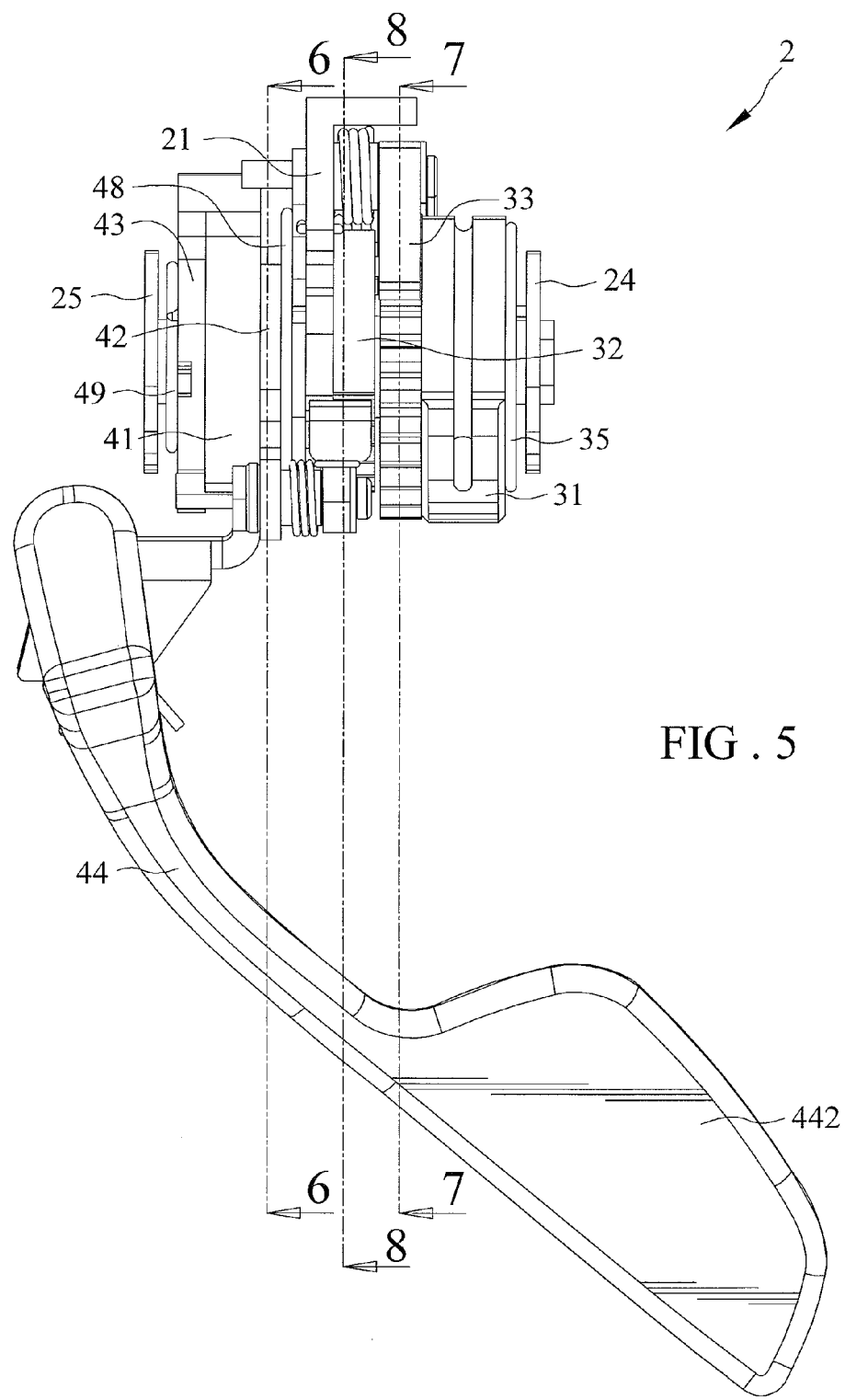
FIG. 5 is a side view of the control assembly embodying the present invention.

A speed control device according to the preferred teachings of the present invention is shown in FIGS. 1-25 of the drawings. The speed control device is adapted to be used in connection with a speed changing device of a bicycle. According to the preferred form shown, the speed control device includes a housing 1 defining a first end 101 and a second end 102 opposite to the first end 101, and the first end 101 is adapted to connect to the bicycle. The housing 1 includes a compartment 11 in which a control assembly 2 and a brake assembly 5 are pivotally received. The control assembly 2 is retained in the compartment 11 via two fasteners 13, and the fasteners 13 are respectively inserted through two apertures 12 in the housing 11 and engaged in the control assembly 2. The control assembly 2 includes a fixing member 20 installed to the housing 1, a first engaging mechanism 30 pivotally connected to the fixing member 20, and a second engaging mechanism 40 pivotally connected to the fixing member 20.

The fixing member 20 includes a body 21, a first pawl device 22 selectively engaged with the first engaging mechanism 30, and a second pawl device 23 selectively engaged with the first engaging mechanism 30. The body 21 has two fixing holes 211 corresponding to the apertures 12 of the housing 11 and inserted by the fasteners 13, respectively. The body 21 further has a first side 212 and a second side 213 opposite to and parallel to the first side 212.

The first side 212 has a first shaft 214 extending therefrom, a first connected portion 215 and a second connected portion 216 extending therethrough and adjacent to the first shaft 214. Additionally, the first shaft 214 includes a first coupling section 2141 on one end thereof distal from the first side 212, and a first rotating section 2142 defined between the first coupling section 2141 and the first side 212. The first coupling section 2141 has an outer periphery which has a non-circular cross section.

The second side 213 has a second shaft 217 extending therefrom. The second shaft 217 includes a second coupling section 2171 on one end thereof distal from the second side 213, and a second rotating section 2172 defined between the second coupling section 2171 and the second side 213. The second coupling section 2171 has an outer periphery which has a non-circular cross section.

The first pawl device 22, which is disposed to the first connected portion 215 of the body 21, includes a first rod 221 and a first pawl 222. The first rod 221 includes a proximal end installed to the first connected portion 215, and a distal end mounted by a first orifice 2221 of the first pawl 222. The second pawl device 23, which is disposed to the second connected portion 216, includes a second rod 231 and a second pawl 232. The second rod 231 includes a proximal end installed to the second connected portion 216, and a distal end mounted by a second orifice 2321 of the second pawl 232.

The fixing member 20 includes a first retaining unit 24 installed thereto, and a second retaining unit 25 installed thereto. The first retaining unit 24 has a retaining hole 241 inserted by the first coupling section 2141 of the first shaft 214. The second retaining unit 25 has a retaining hole 251 inserted by the second coupling section 2171 of the second shaft 217. The first and second retaining holes 241 and 251 have shapes conforming to the first and second coupling sections 2141 and 2171 where the first and second retaining units 24 and 25 are mounted. Therefore, the first and second retaining units 24 and 25 are connected rigidly and are prevented from rotation with respect to a longitudinal axis of related first and second shafts 214 and 217, respectively.

The first engaging mechanism 30 includes a cable-receiving member 31, a first toothed member 32 and a second toothed member 33. Additionally, the cable-receiving member 31, which is adapted to receive a shifting cable that is adapted to cause speed change upon operation of the speed control device, includes a retaining section 314 on which an end of the shifting cable is secured, and a groove 315 formed on its outer periphery and provided for preventing a length of the shifting cable which is engaged with an outer periphery of the cable-receiving member 31 from dislodging therefrom. Specifically, the cable-receiving member 31 is rotatable in a first rotation direction R1 to up-shift the speed and a second rotation direction R2 to down-shift the speed. Each of the cable-receiving member 31 and the first and second toothed members 32 and 33 has a hole 311, 321 and 331, respectively, and the holes 311, 321 and 331, which are inserted by the first shaft 214, have a diameter not less than that of the first shaft 214. Each of the cable-receiving member 31 and the first and second toothed members 32 and 33 further has at least one pinhole 312, 322 and 332 adjacent to a related hole 311, 321 and 331, respectively, and the pinholes 312, 322 and 332 are coaxial with each other. The first engaging mechanism 30 includes at least one pin 34 and an biasing member 35. The pin 34 inserts through the pinholes 312, 322 and 332 of each of the cable-receiving member 31 and the first and second toothed members 32 and 33 such that the cable-receiving member 31 and the first and second toothed members 32 and 33 are rigidly connected to rotation. The biasing member 35 includes a proximal end engaging a limiting portion 242 of the first retaining unit 24, and a distal end engaging a limiting portion 313 of the cable-receiving member 31 of the first engaging mechanism 30. Preferably, the limiting portions 242 and 313 are in a form of holes. So, if the cable-receiving member 31 is rotated in the first rotation direction R1 such that the biasing member 35 is tensioned, releasing the biasing member 35 from tension would cause the cable-receiving member 31 to rotate in the second rotation direction R2.

The first toothed member 32 includes a retaining toothed section 323 formed on its outer periphery and including a plurality of teeth. Each tooth is asymmetric, or the two sides of each tooth are not equal. Preferably, each tooth extends substantially toward the first rotation direction R1, and two adjacent teeth have a root formed thereon. The second toothed member 33 includes a first toothed section 333 corresponding to the first pawl 222, and a second toothed section 334 corresponding to the second pawl 232. Each of the first toothed section 333 and the second toothed section 334 is formed on an outer periphery of the second toothed member 33 of the first engaging mechanism 30 and includes a plurality of teeth, respectively. Each tooth is asymmetric, or the two sides of each tooth are not equal. Preferably, each tooth extends substantially toward the first rotation direction R1.

The first pawl 222 has a first engaging section 2222 formed on one end thereof, and a first abutted section 2223 formed on the other end thereof and extending toward the second side 213 of the body 21. The body 21 has an aperture 218 formed between the first and second connected portions 215 and 216, in which the first abutted section 2223 inserts through the aperture 218 and protrudes out of the body 21. The first pawl 222 is biased by a first biasing element 223. Preferably, the first biasing element 223 is a torque spring having a first leg extending therefrom and connecting to the first abutted section 2223 of the first pawl 222, and a second leg extending therefrom and connecting to the body 21 so that the first engaging section 2222 is biased to disengage from the first toothed section 333 of the second toothed member 33. The second pawl 232 has a second engaging section 2322 formed on one end thereof distal from the second orifice 2321, and a second abutted section 2323 formed between the second orifice 2321 and the second engaging section 2322 and extending toward the second side 213 of the body 21. The second abutted section 2323 protrudes out of the body 21. The second pawl 232 is biased by a second biasing element 233. Preferably, the second biasing element 233 is a torque spring having a first leg extending therefrom and connecting to the second abutted section 2323 of the second pawl 232, and a second leg extending therefrom and connecting to the body 21 so that the second engaging section 2222 is biased to engage with the second toothed section 334 of the second toothed member 33. The teeth of the first toothed section 333 have an arrangement like that of the teeth of the second toothed section 334. However, the first and second toothed sections 333 and 334 have a phase shift between them such that the first engaging section 2222 of the first pawl 222 and the second engaging section 2322 of the second pawl 232 would not engage with a related tooth of each of the first and second toothed sections 333 and 334, simultaneously.

The second engaging mechanism 40 includes a catching member 41, a control plate 42 and an engagement plate 43. Each of the catching member 41, the control plate 42 and the engagement plate 43 is mounted to the second rotating section 2172 of the second shaft 217. The control plate 42 is disposed adjacent to the second side 213 of the body 21, the engagement plate 43 is disposed adjacent to the second retaining unit 25, and the catching member is disposed between the control plate 42 and the engagement plate 43. The catching member 41 has a mounting portion 411 mounted to the second rotating section 2172 of the second shaft 217, and a catching portion 412 adapted to connect to a operation lever 44 of the second engaging mechanism 40. The mounting portion 411 includes a first side 4111 adjacent to the second side 213 of the body 21, a second side 4112 opposite from the first side 4111, and a central bore 413 extending from the first side 4111 to the second side 4112. The central bore 413 is mounted to the second rotating section 2172 of the second shaft 217 such that the catching member 41 is able to rotate with respect to the second shaft 217 of the body 21. The first side 4111 of the mounting portion 411 has a first emboss 414 formed thereon and adjacent to the catching portion 412, and the first emboss 414 extends toward the second side 213 of the body 21. The second side 4112 of the mounting portion 411 has a second emboss 415 formed thereon and adjacent to the catching portion 412, and the second emboss 415 extends away from the second side 213 of the body 21. The operation lever 44 is pivotally coupled to the catching portion 412 via a fastener 45. Preferably, the fastener 45 in a form of a pin is inserted through a support hole 4121 of the catching portion 412 and a pivotal hole 441 of the operation lever to prevent the operation lever 44 from detaching from the catching member 41. The, operation lever 44 is pivoted from its control end 442 to pivot the catching member 41. Moreover, the operation lever 44 is biased by a biasing element 46, which is disposed between the catching member 41 and the operation lever 44.

The control plate 42 has a disk portion 421 and an arm portion 422 extending from the disk portion 421. The disk portion 421 has a hole 423 formed thereon and mounted to the second shaft 217 of the body 21 such that the engagement plate 43 is able to rotate with respect to the second shaft 217 of the body 21. The second engaging mechanism 40 further includes a clutching device 47, which is disposed to the arm portion 422 of the control plate 42 and is selectively engaged with the first engaging mechanism 30. The clutching device 47 has a rod 471, a pawl 472 and a biasing element 473. The rod 471 includes a proximal end installed to the arm portion 422 of the control plate 42, and a distal end mounted by an orifice 4721 of the pawl 472. The pawl 472 has an engaging section 4722 and an engaging surface 4723 which are formed on one end thereof. The engaging section 4722 and the engaging surface 4723 correspond to the retaining toothed section 323 of the first toothed member 32 and a block 21a of the body 21, respectively. The pawl 472 is biased by a biasing element 473. Preferably, the biasing element 473 is a torque spring and includes a plurality of coaxially disposed coiled sections inserted by the rod 471 and a first leg extending therefrom and engaging to the control plate 42, and a second leg extending therefrom and connecting to the pawl 472 where between the orifice 4721 and the engaging section 4722 so that the engaging section 2222 is biased to engage with the retaining toothed section 323 of the first toothed member 32. The arm portion 422 has an abutted surface 4221 corresponding to the first emboss 414 of the catching member 41.

The second engaging mechanism 40 includes a biasing member 48 which includes a proximal end engaging a limiting portion 219 of the body 21, and a distal end engaging a hook 424 of the control plate 42 so that the abutted surface 4221 of the engagement member 43 is biased to abut against the first emboss 414 of the catching member 41. Preferably, the limiting portion 219 is in a form of a hole. So, if the control plate 42 is rotated in the second rotation direction R2 such that the biasing member 48 is tensioned, releasing the biasing member 48 from tension would cause the control plate 42 to rotate in the first rotation direction R1.

The engagement plate 43 includes a hole 431, which extends therethrough and is mounted to the second rotating section 2172 of the second shaft 217, an abutted surface 434 corresponding to the second emboss 415 of the catching member 41, and a first protrusion 432 and a second protrusion 433, which protrude from an outer periphery thereof. The first and second protrusions 432 and 433 correspond to the first abutted section 2223 of the first pawl device 22 and the second abutted section 2323 of the second pawl device 23, respectively. The first protrusion 432 has a first portion 4321 distal from the second protrusion 433 and a second portion 4322 adjacent to the second protrusion 433. Moreover, the first portion 4321 and a center of the hole 431 have a distance therebetween smaller than that between the second portion 4322 and the center of the hole 431. The second protrusion 433 has a first portion 4331 adjacent to the first protrusion 432 and a second portion 4332 distal from the second protrusion 433. Moreover, the first portion 4331 and the center of hole 431 have a distance therebetween smaller than that between the second portion 4332 and the center of the hole 431.

The second engaging mechanism 40 includes a biasing member 49 which includes a proximal end engaging a limiting portion 252 of the second retaining unit 25, and a distal end engaging a limiting portion 435 of the engagement plate 43 so that the abutted surface 434 of the engagement plate 43 is biased to abut against the second emboss 415 of the catching member 41. Preferably, the limiting portions 252 and 435 are in a form of a hole. So, if the engagement plate 43 is rotated in the first rotation direction R1 such that the biasing member 49 is tensioned, releasing the biasing member 49 from tension would cause the engagement plate 43 to rotate in the second rotation direction R2.

Figure 6:
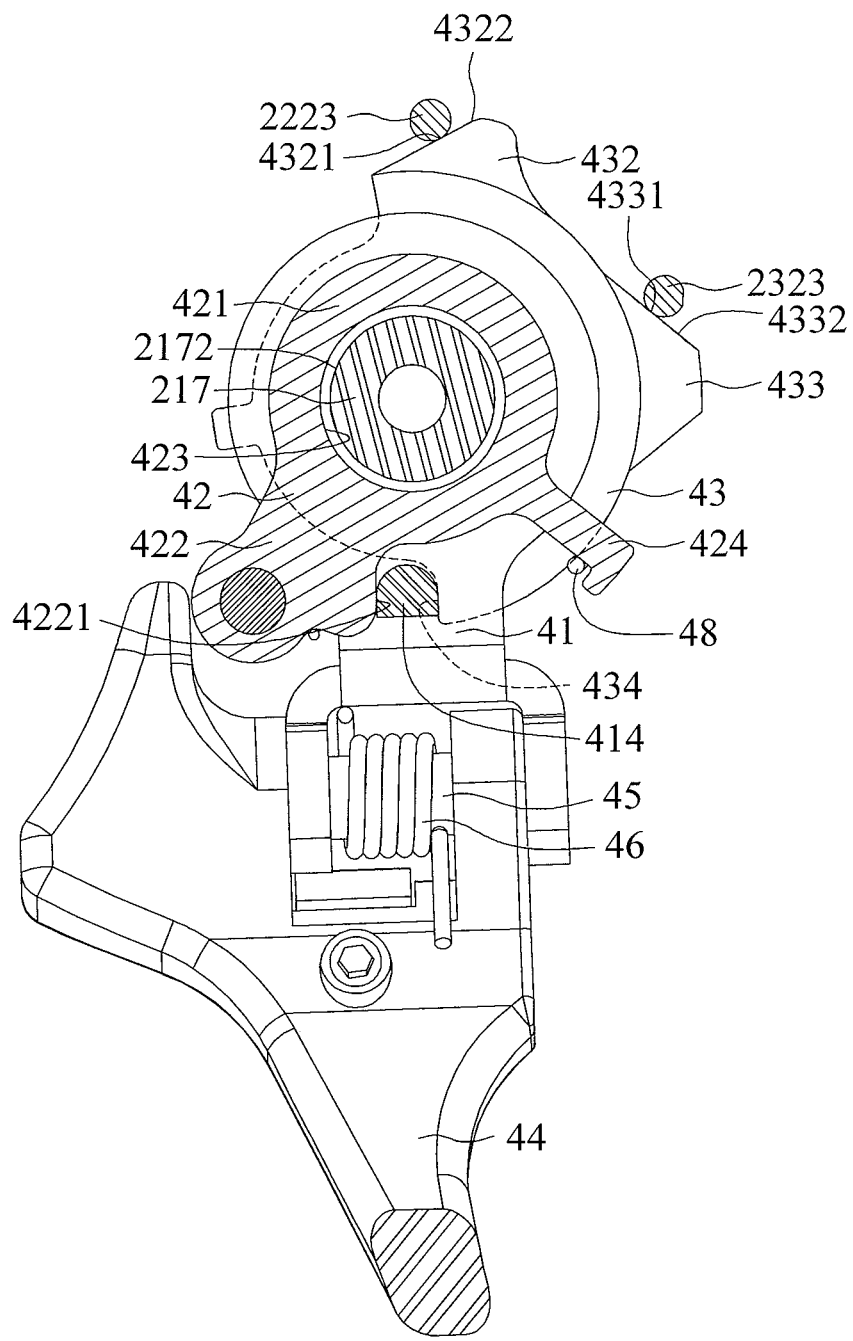
FIG. 6 is a cross-section view taken along line 6-6 of FIG. 5.
Figure 7:
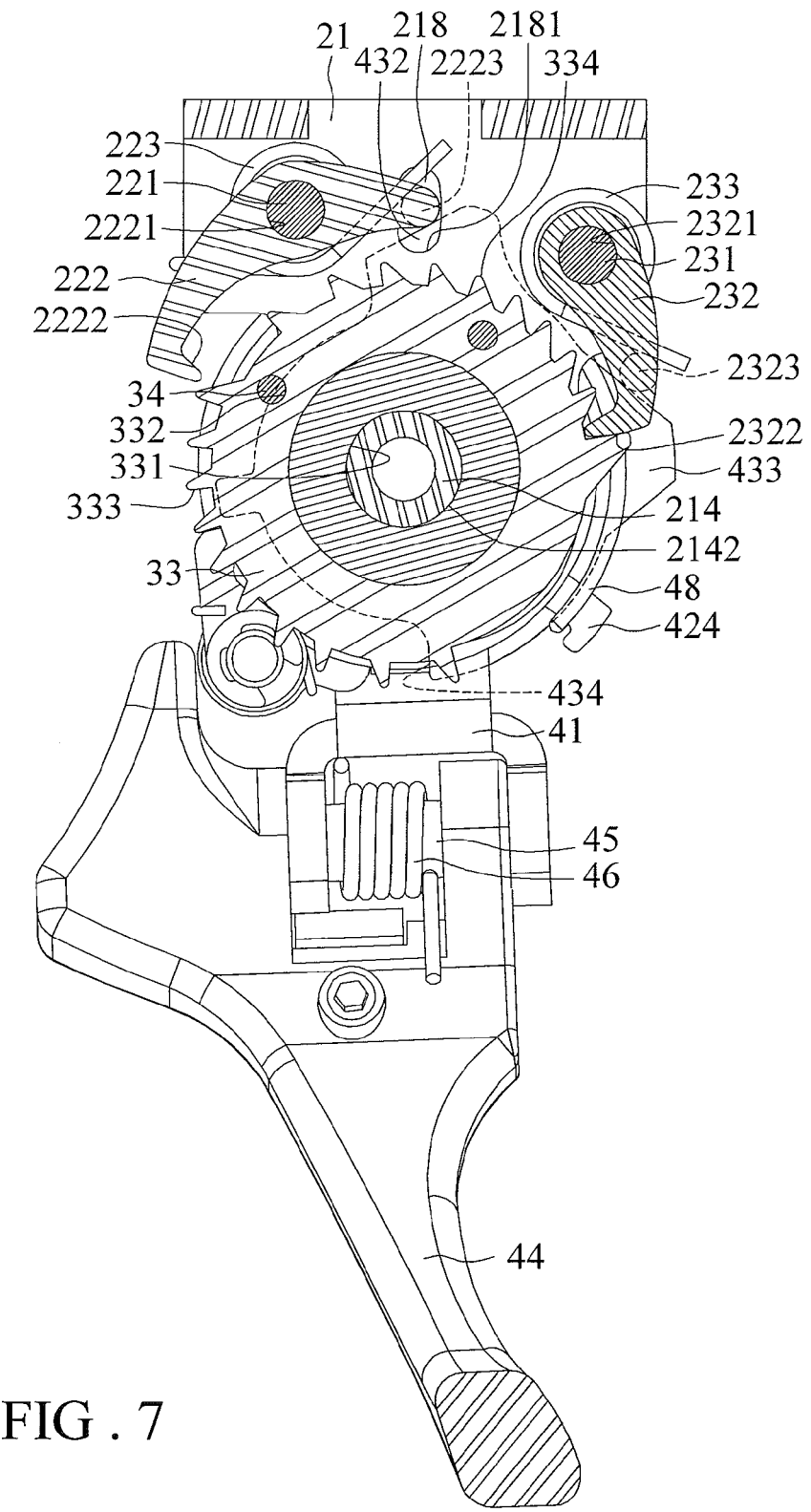
FIG. 7 is a cross-section view taken along line 7-7 of FIG. 5.
Figure 8:
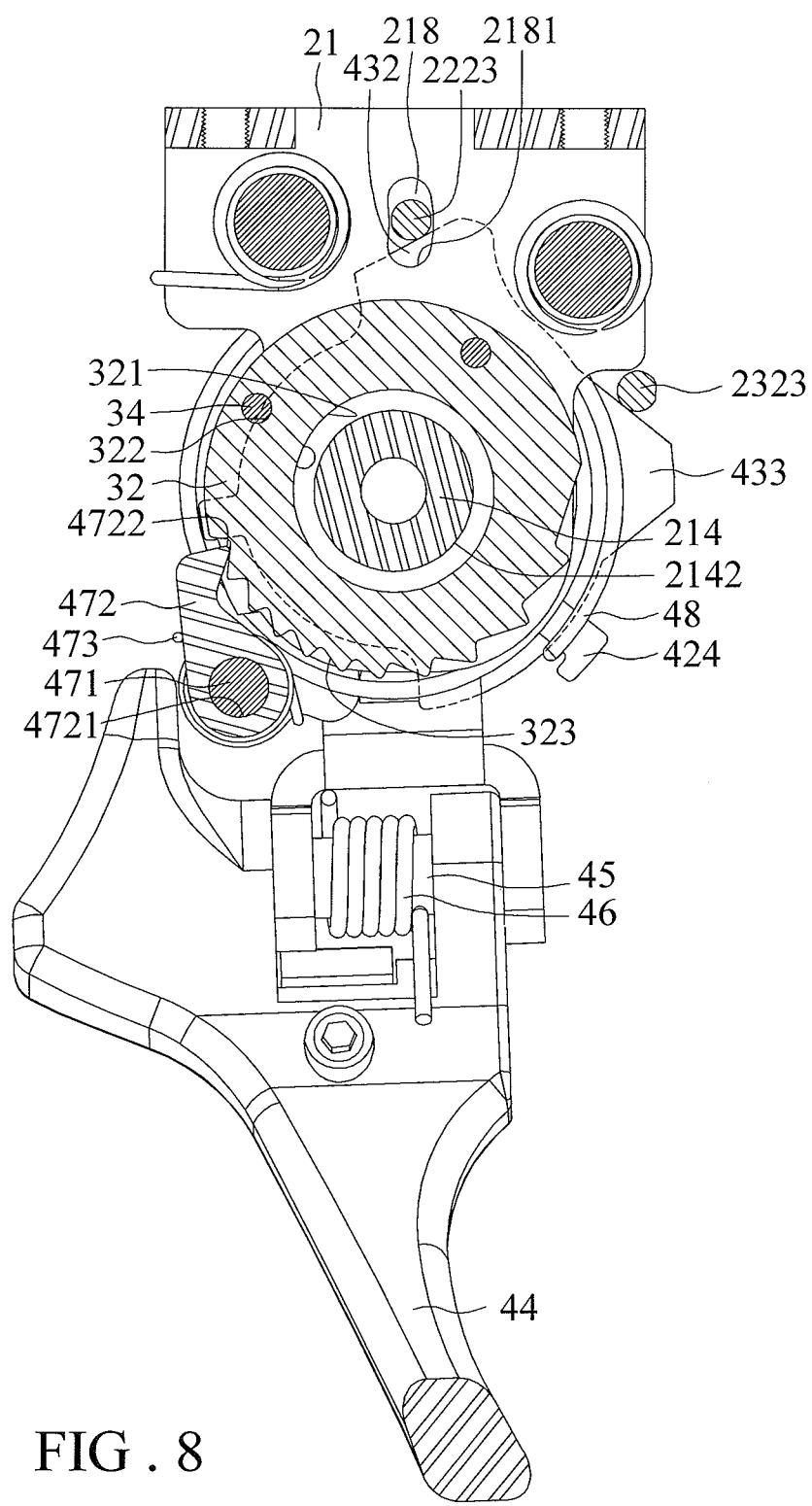
FIG. 8 is a cross-section view taken along line 8-8 of FIG. 5.
Figure 9:
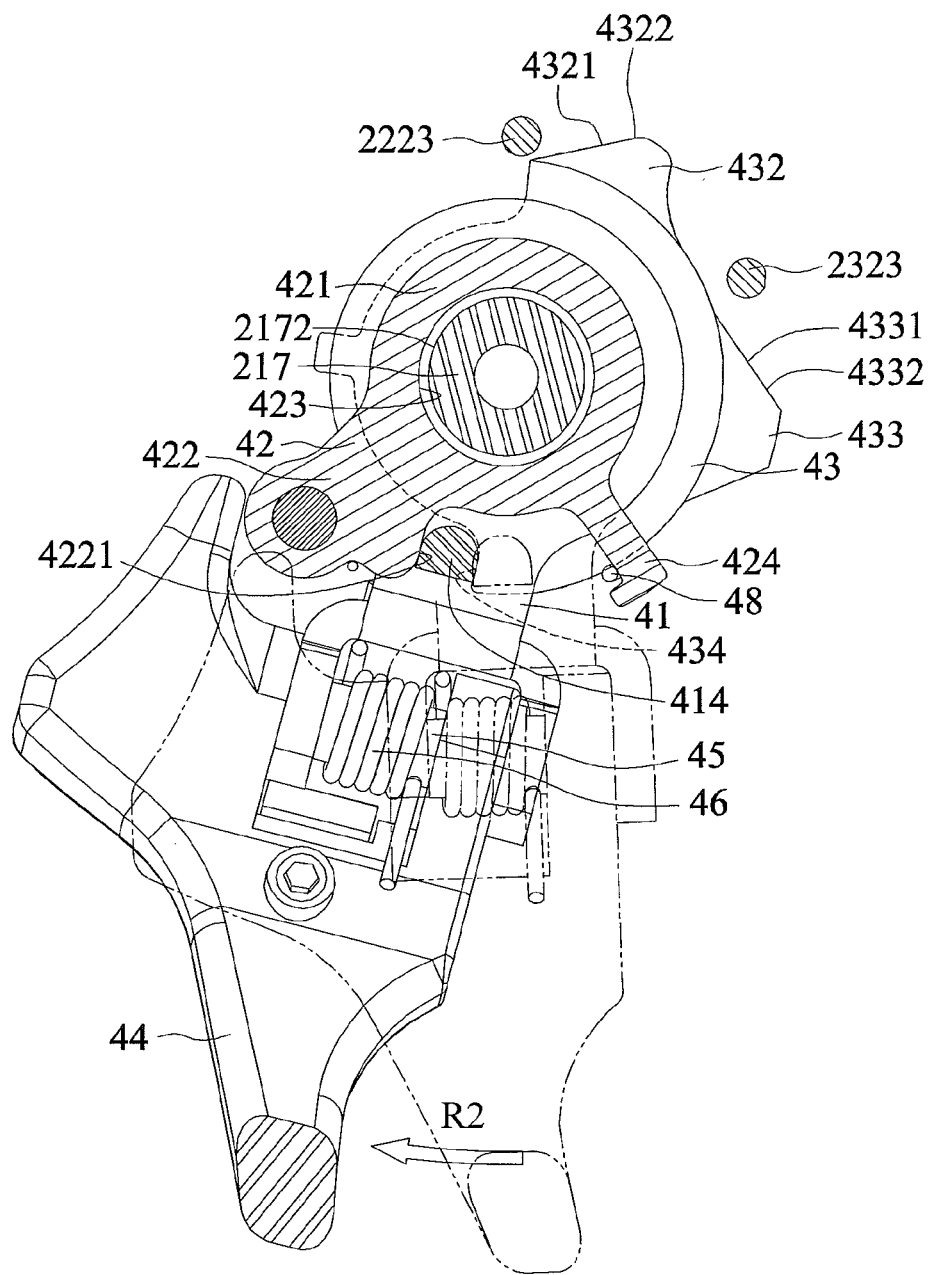
FIG. 9 is an extended view of FIG. 6 and shows an operation lever of the control assembly pivoted in a second rotation direction to effect one speed change.
Figure 10:
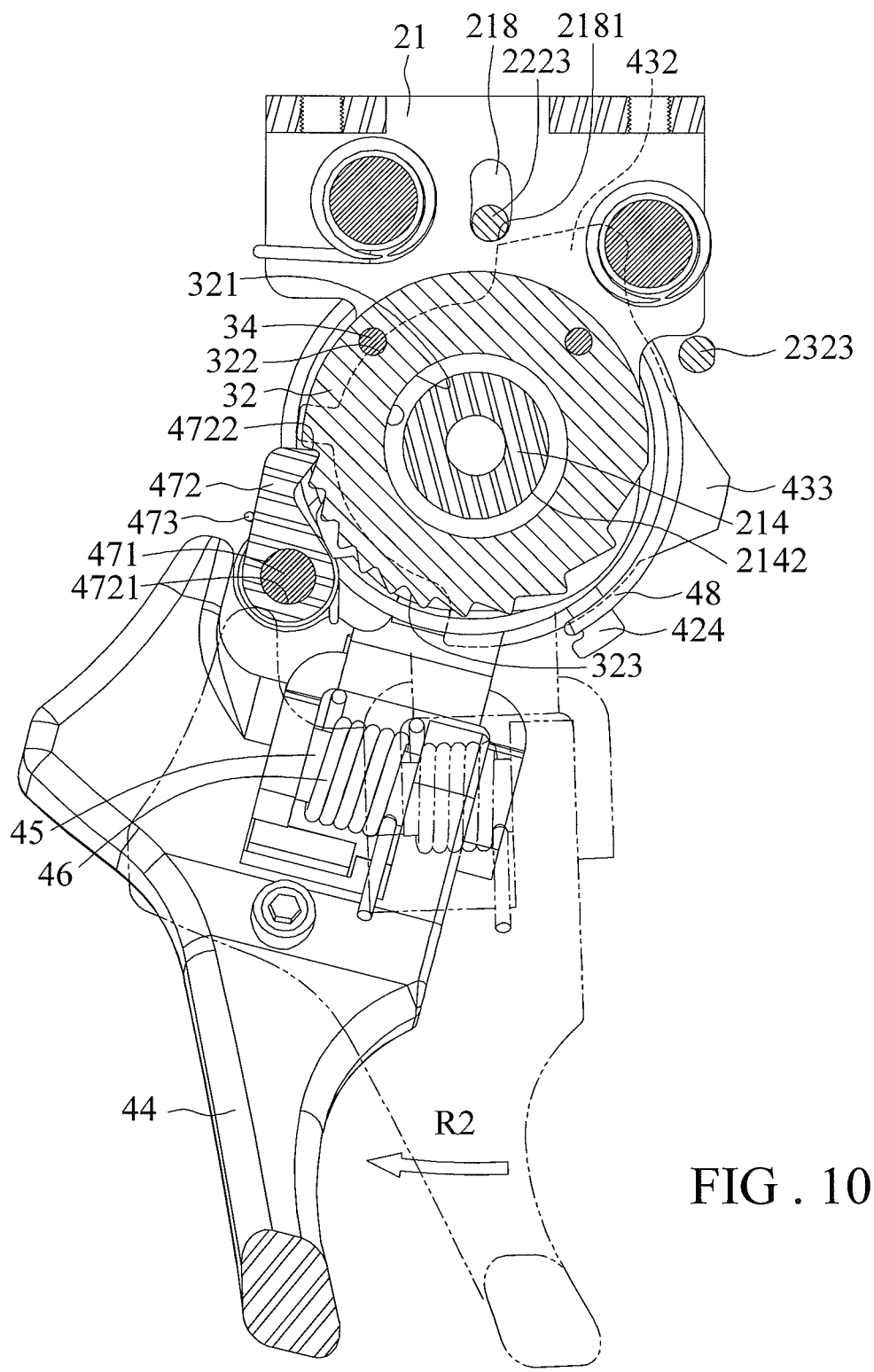
FIG. 10 is an extended view of FIG. 8 and shows the operation lever of the control assembly pivoted in the second rotation direction to effect one speed change.
Figure 11:
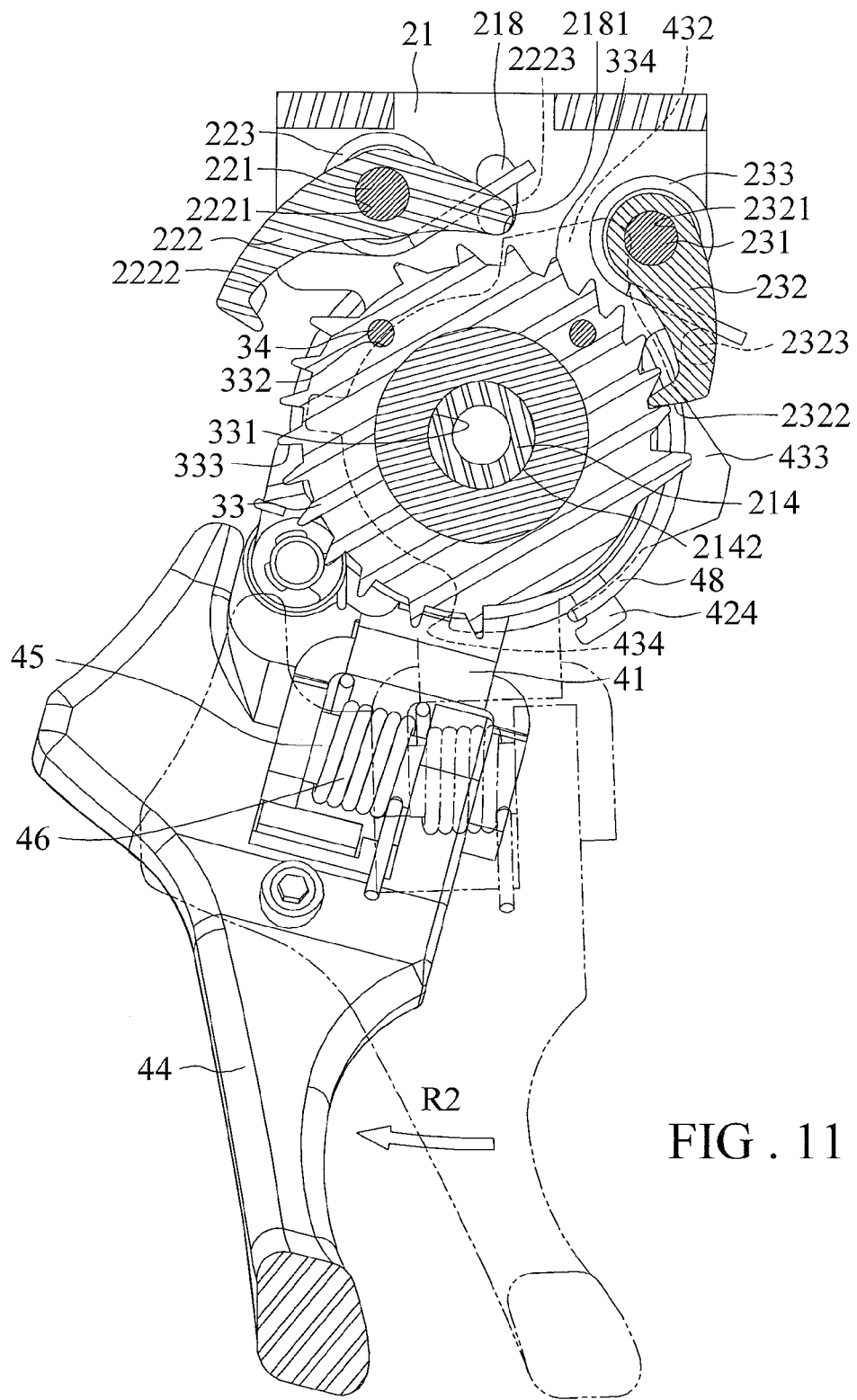
FIG. 11 an extended view of FIG. 7 and shows the control assembly in a position corresponding to FIG. 10.
Figure 12:
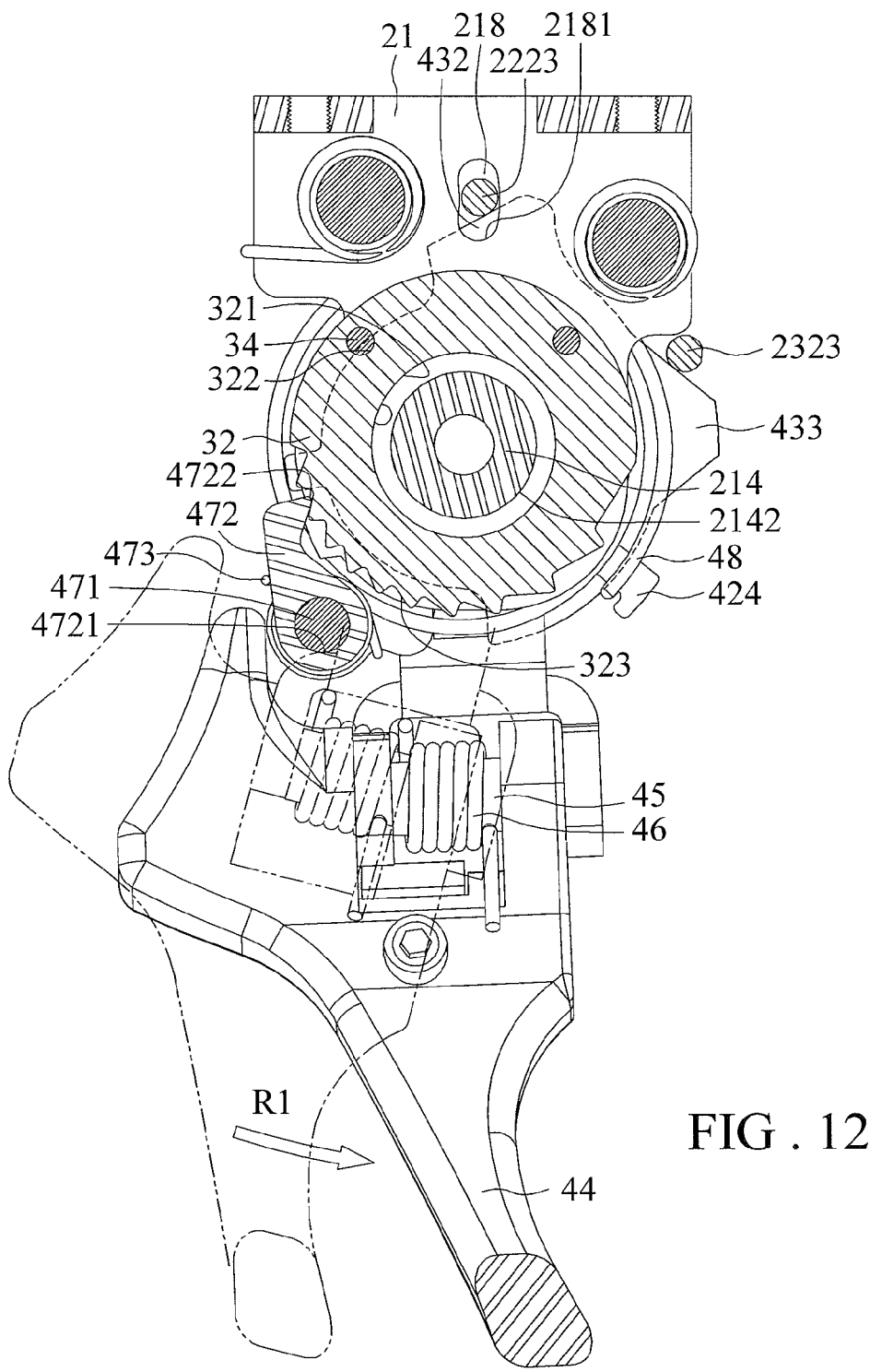
FIG. 12 is an extended view of FIG. 10 and shows the control assembly accomplishing one speed change.
Figure 13:
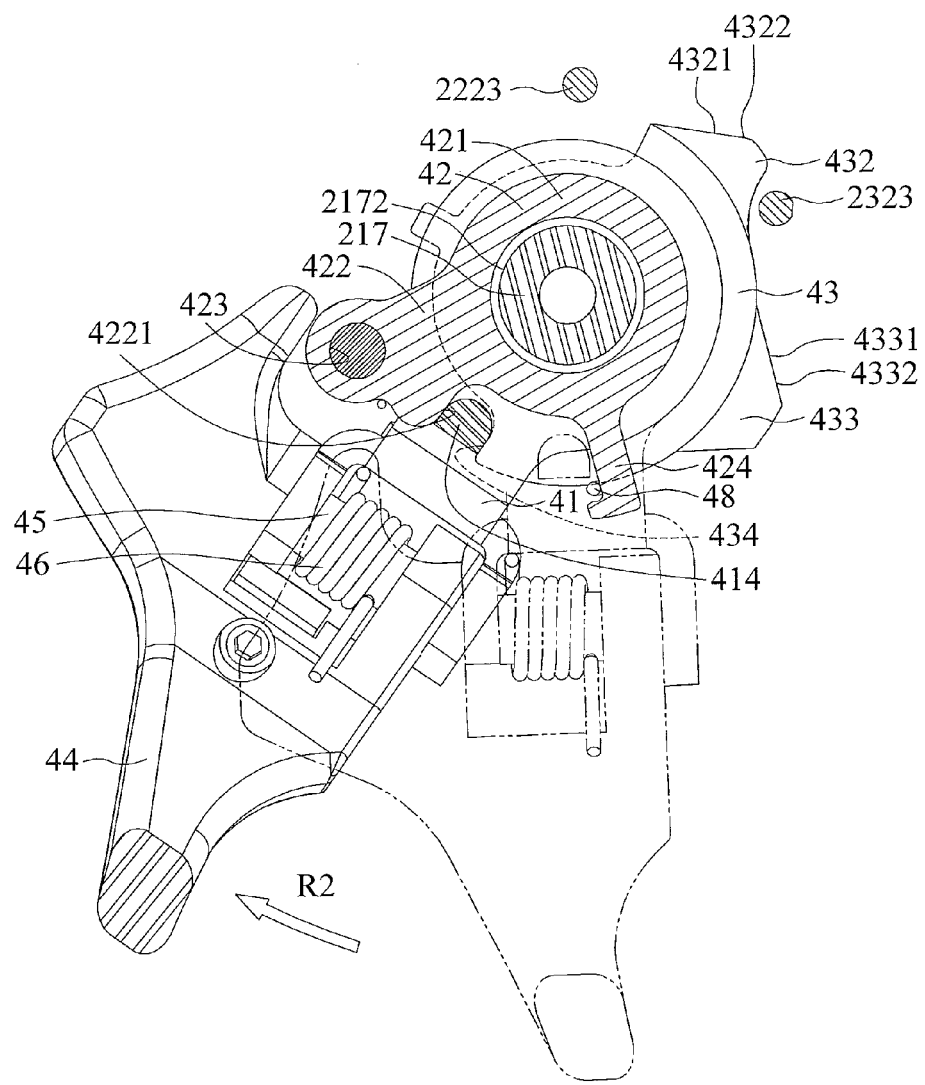
FIG. 13 is an extended view of FIG. 6 and shows the operation lever of the control assembly pivoted in the second rotation direction to effect three speed changes.
Figure 14:
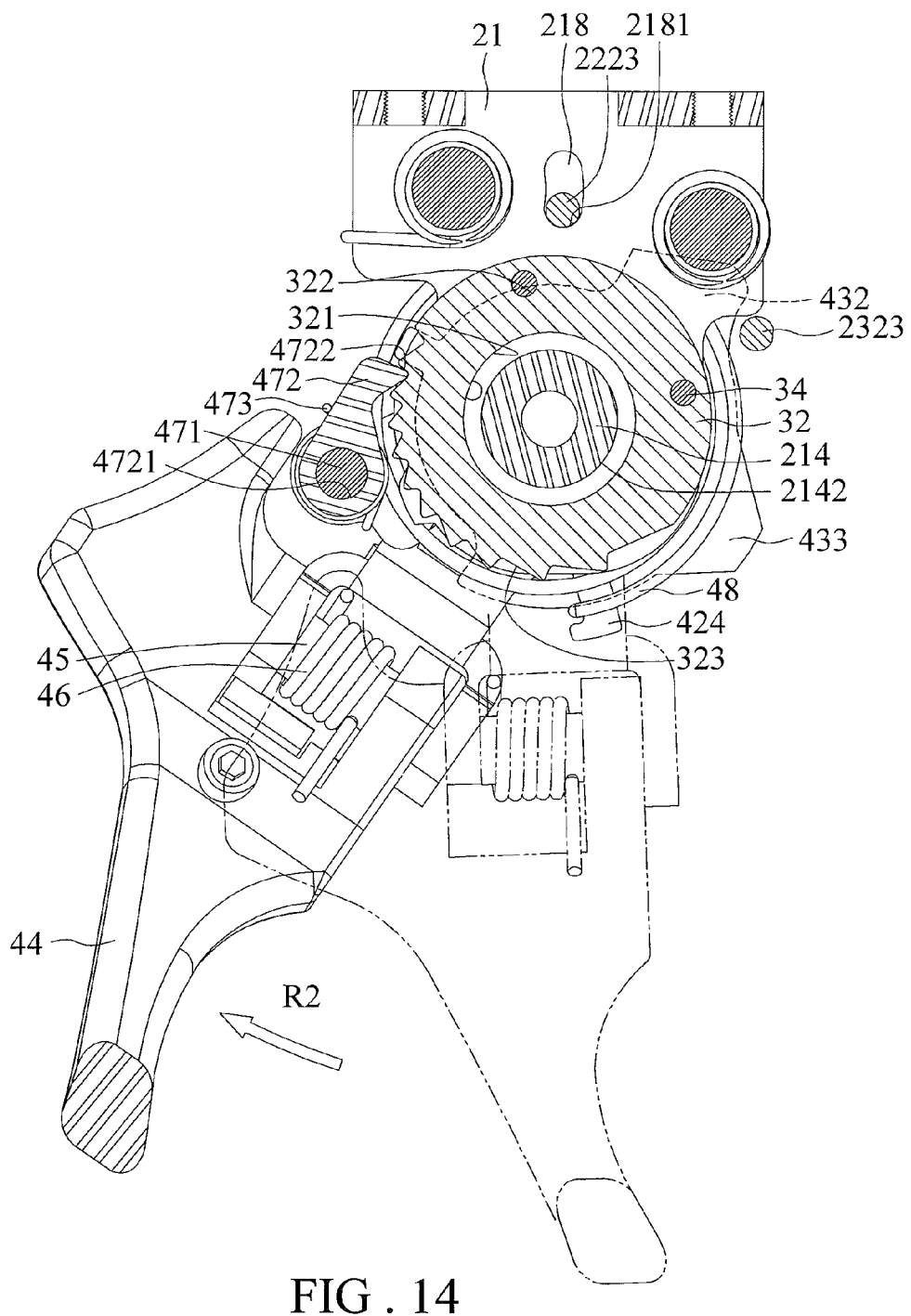
FIG. 14 is an extended view of FIG. 8 and shows the operation lever of the control assembly pivoted in the second rotation direction to effect three speed changes.
Figure 15:
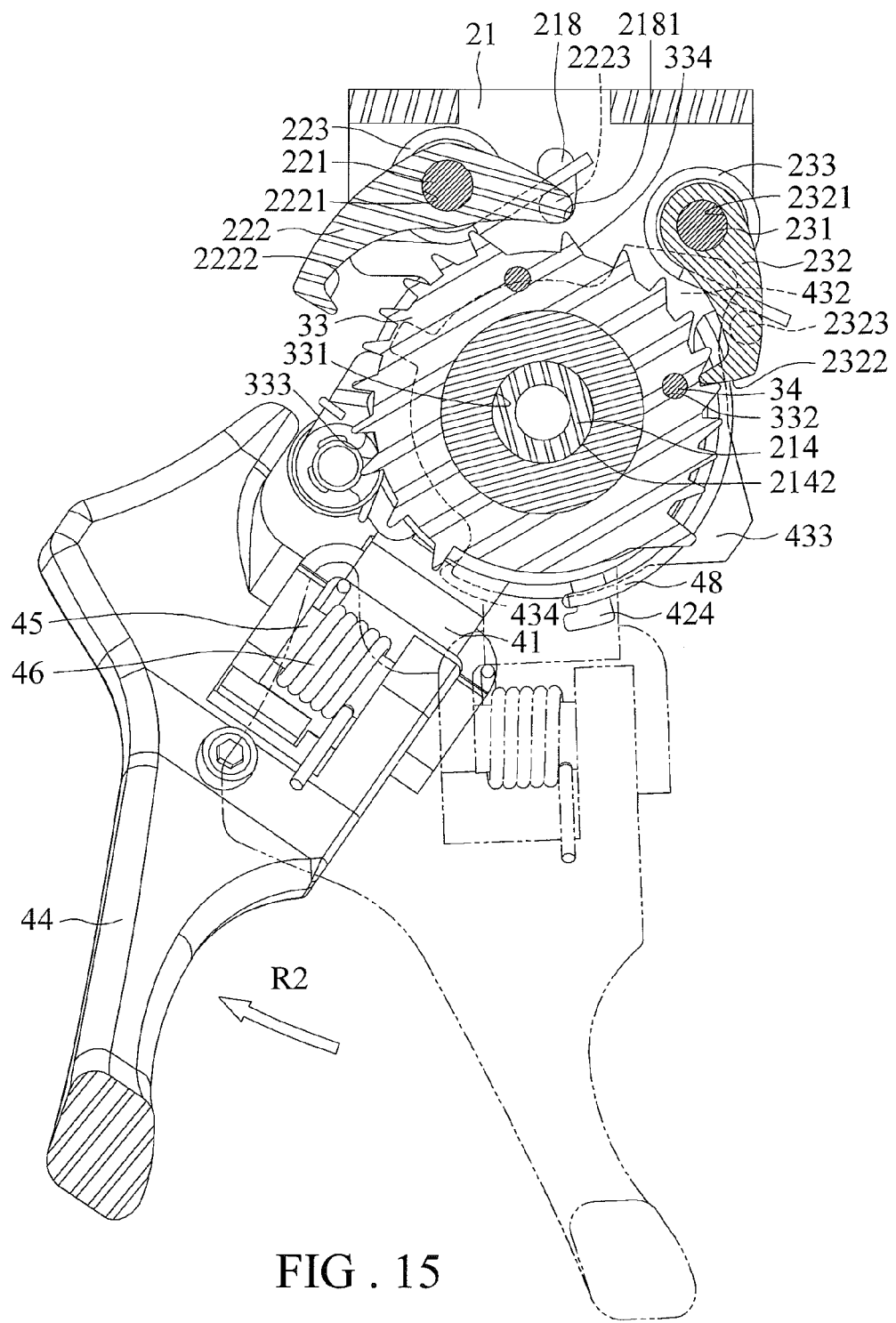
FIG. 15 is an extended view of FIG. 7 and shows the control assembly in a position corresponding to FIG. 14.
Figure 16:
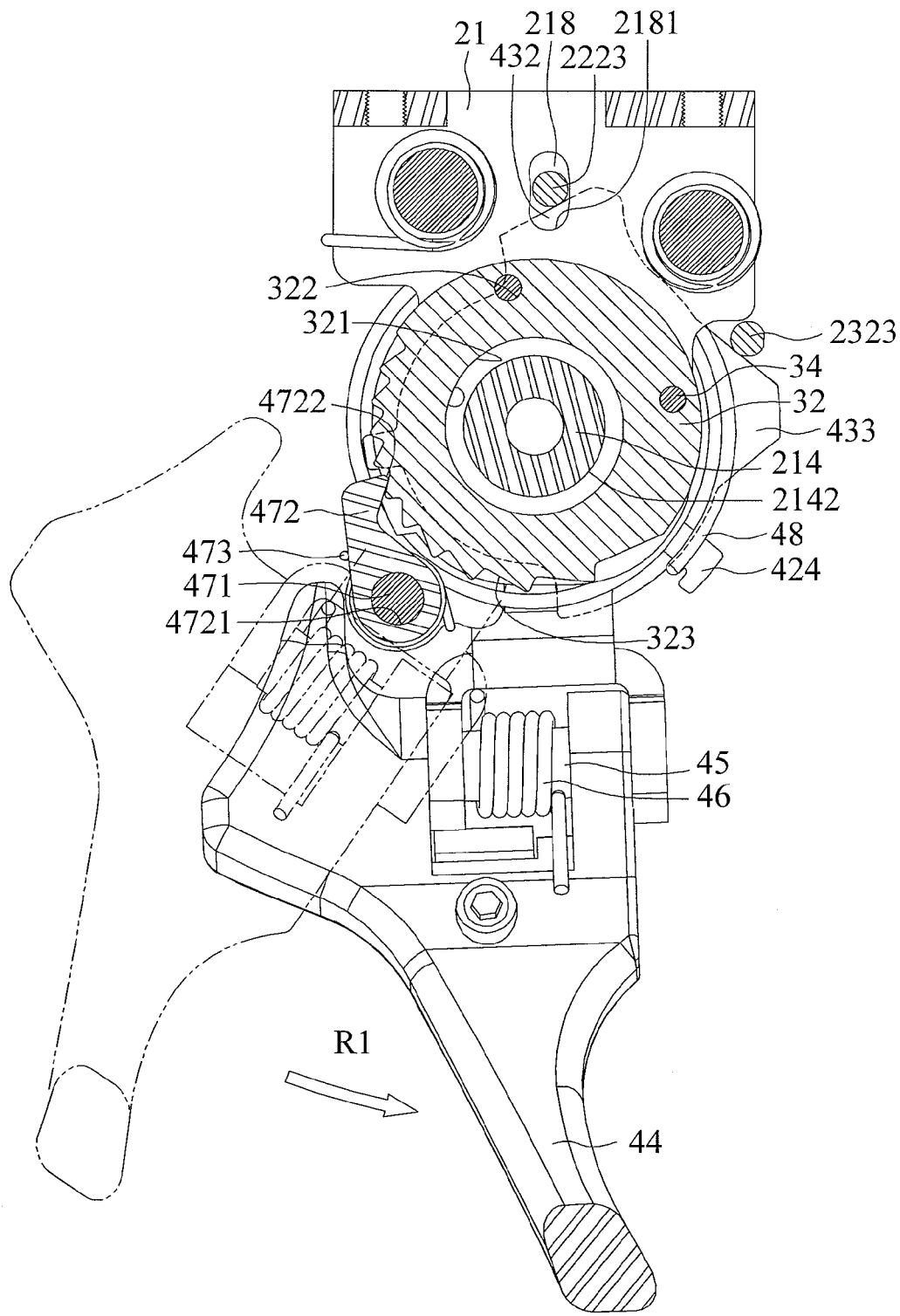
FIG. 16 is an extended view of FIG. 13 and shows the control assembly actuating a three speed change.
Figure 17:
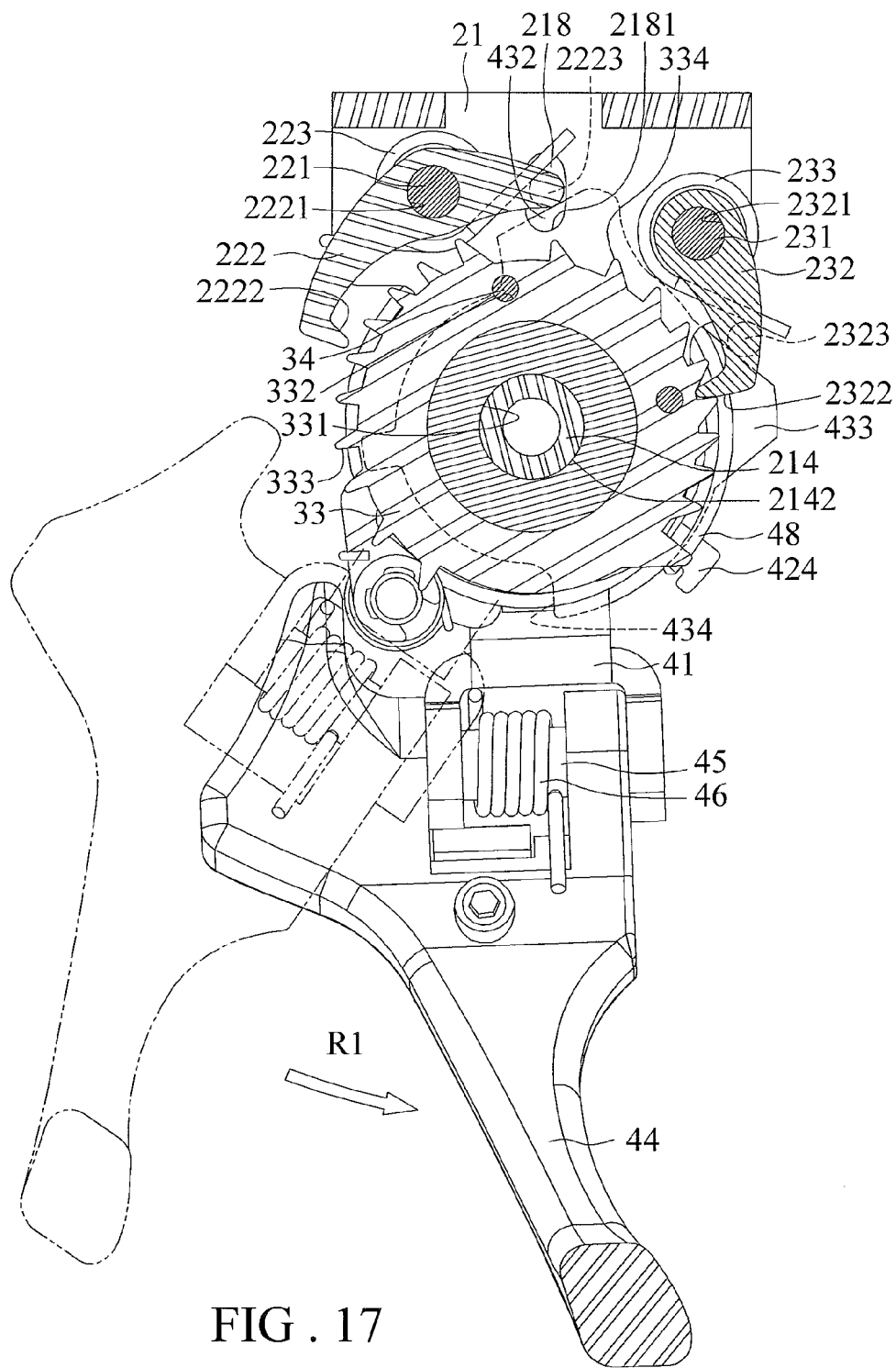
FIG. 17 is an extended view of FIG. 15 and shows the control assembly in a position corresponding to FIG. 16.
Figure 18:
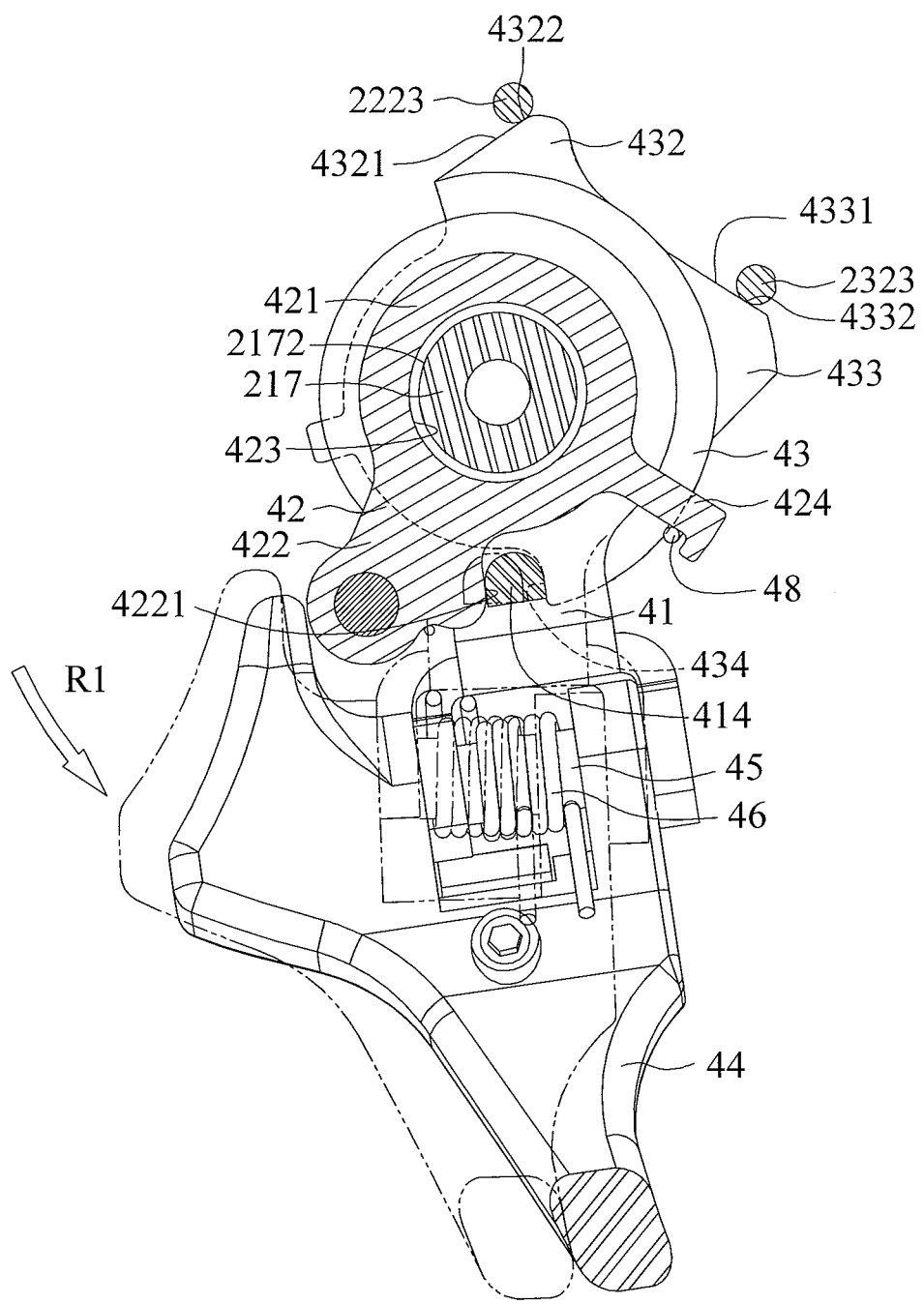
FIG. 18 is an extended view of FIG. 16 and shows the operation lever of the control assembly pivoted in a first rotation direction to effect another speed change.
Figure 19:
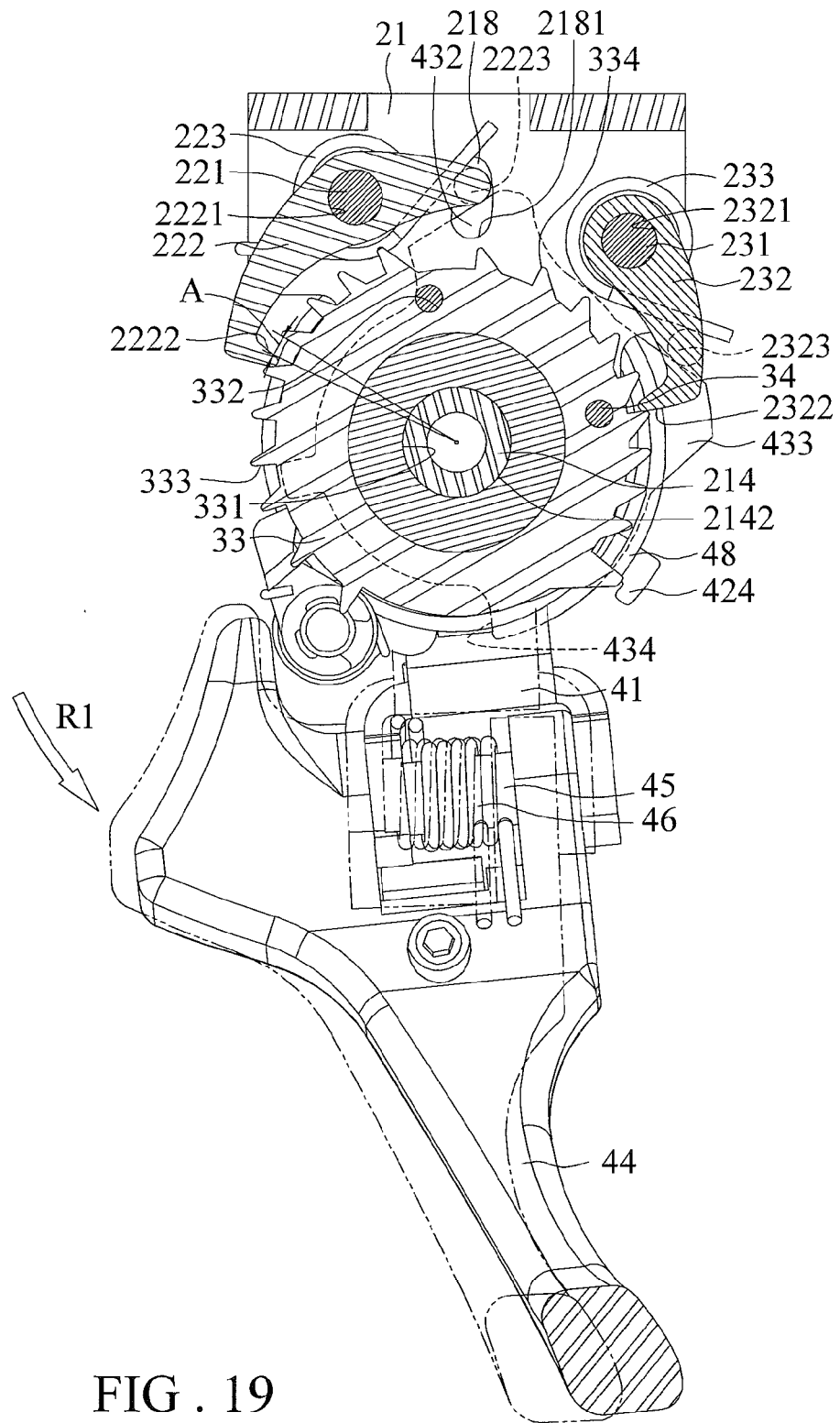
FIG. 19 is an extended view of FIG. 17 and shows a first angular step between a first engaging section and a corresponding tooth.
Figure 20:
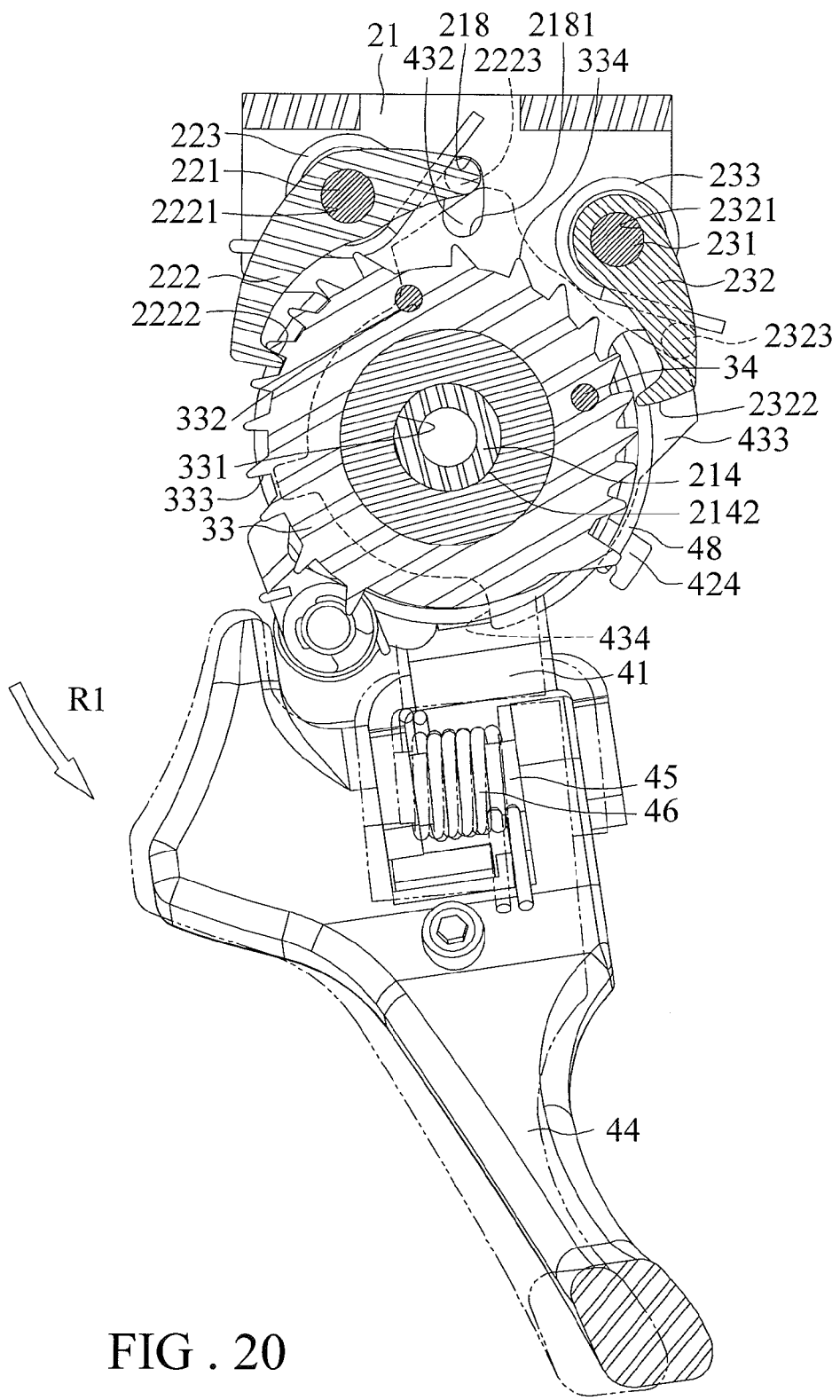
FIG. 20 is an extended view of FIG. 19 and shows the first engaging section engaged with the corresponding tooth.
Figure 21:
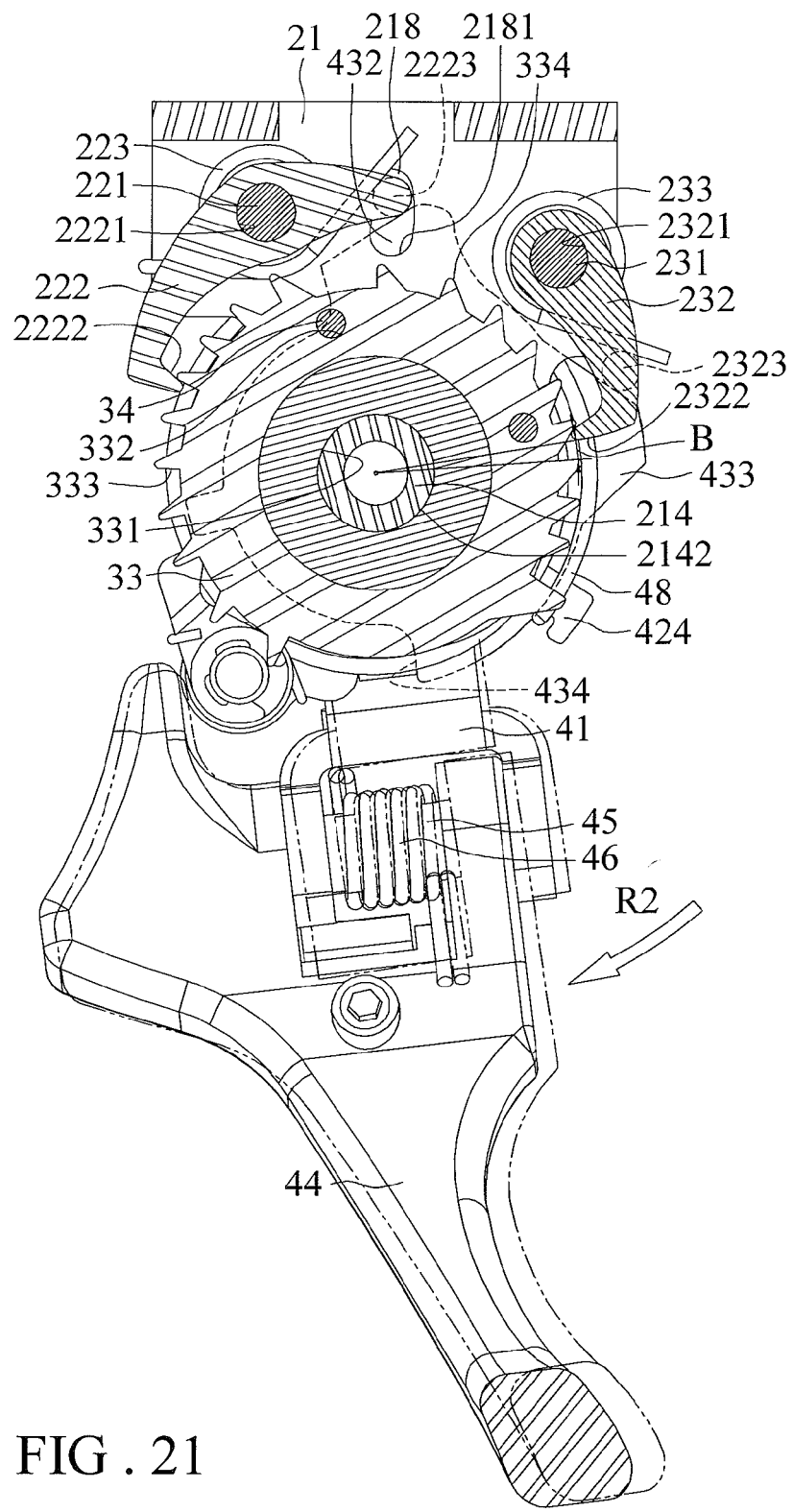
FIG. 21 is an extended view of FIG. 20 and shows a second angular step between a second engaging section and a corresponding tooth.
Figure 22:
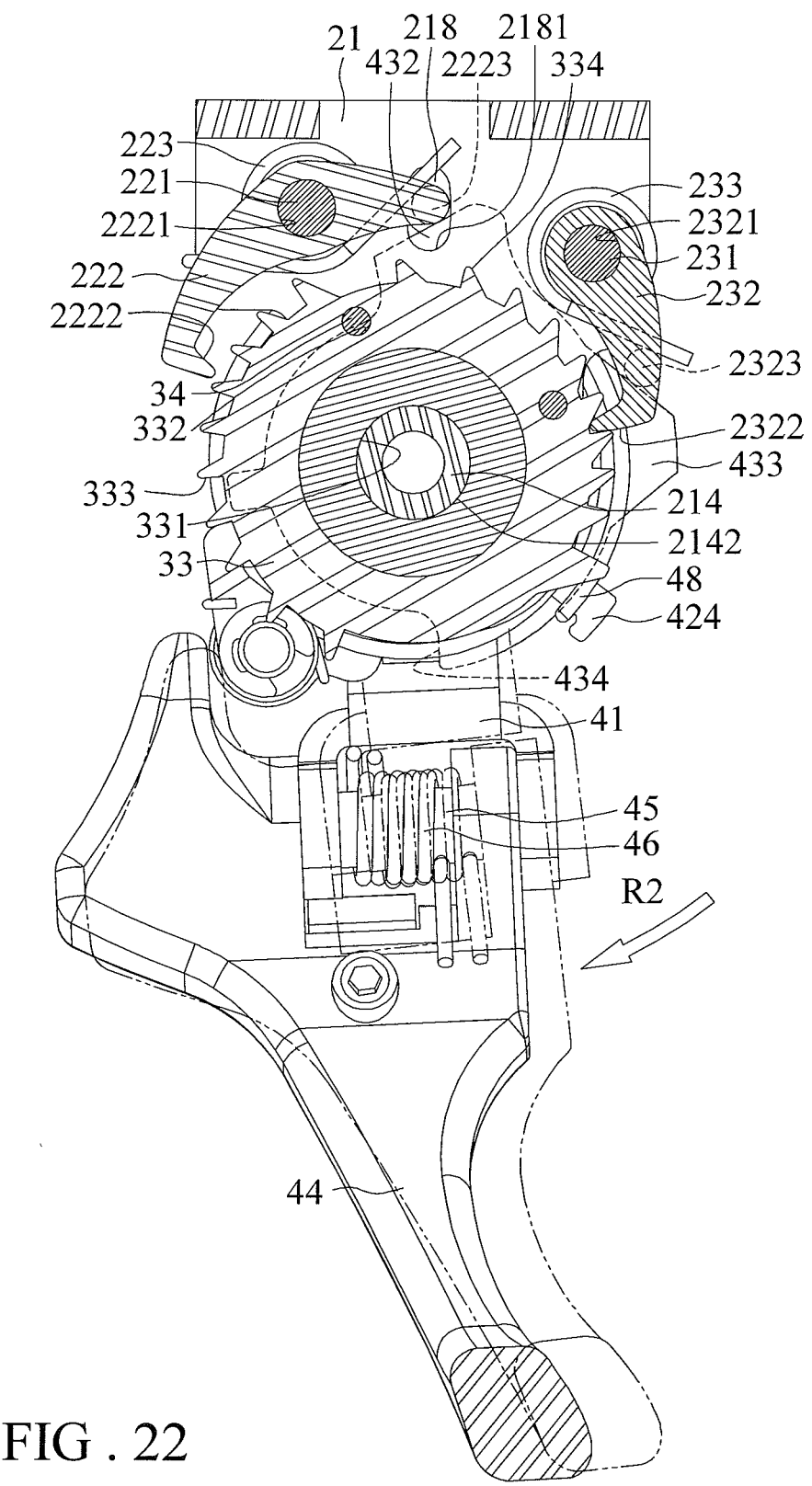
FIG. 22 is an extended view of FIG. 21 and shows the second engaging section is engaged with the corresponding tooth.
Figure 23:
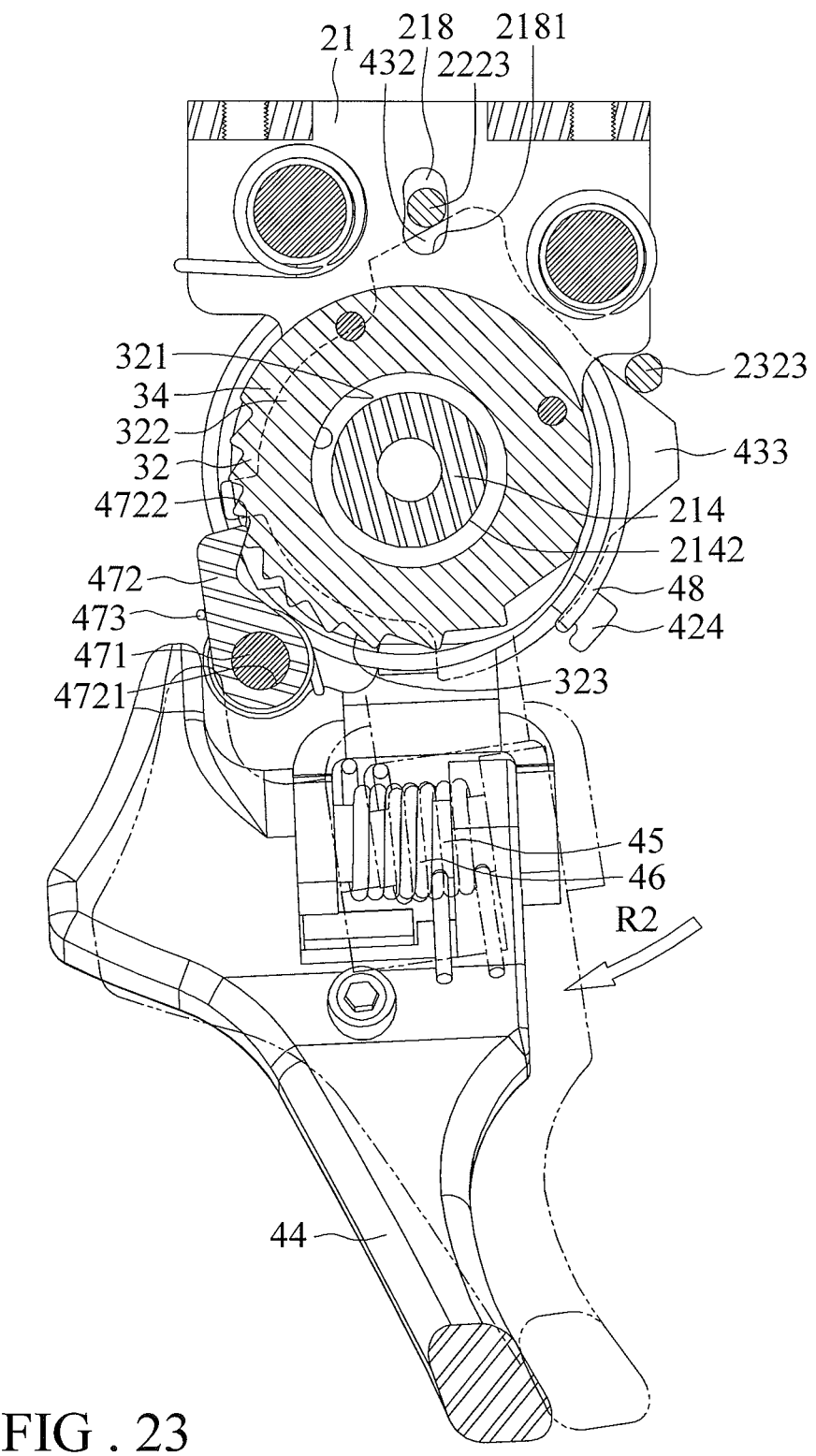
FIG. 23 is an extended view of FIG. 22 and shows a pawl engaged with a next tooth.
Figure 24:
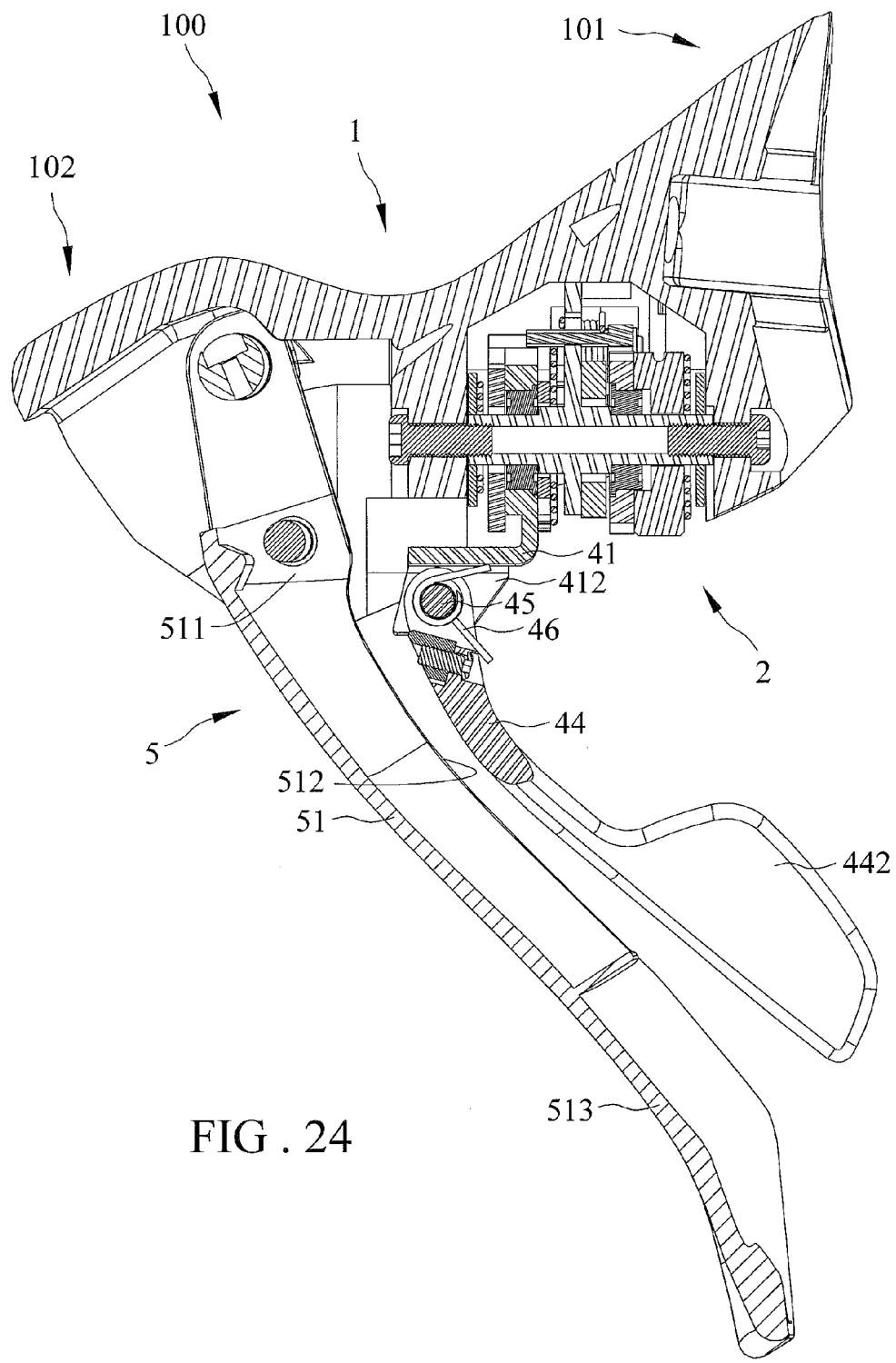
FIG. 24 is a cross-section view taken along line 24-24 of FIG. 1.

Particularly, while the operation lever 44 is not operated by a user, the catching member 41 is in a rest position as shown in FIGS. 6 through 8, i.e., the first abutted section 2223 of the first pawl 222 is abutted by the first portion 4321 of the first protrusion 432 such that the first engaging section 2222 of the first pawl 222 is disengaged from the first toothed section 333 of the second toothed member 33, and the second abutted section 2323 of the second pawl 232 is abutted by the first portion 4331 of the second protrusion 433 such that the second engaging section 2322 of the second pawl 232 is engaged with related tooth of the second toothed section 334 of the second toothed member 33. The second pawl 232 is engaged with the second toothed section 334 of the second toothed member 33 so that the first engaging mechanism 30 would not rotate with respect to the first shaft 214 of the body 21 in the first rotation direction R1. Moreover, the first engaging mechanism 30 is engaged with the biasing member 35 so that the first engaging mechanism 30 would not rotate with respect to the first shaft 214 of the body 21 in the second rotation direction R2 via an elastic force of the biasing member 35. Therefore, the control assembly would not up-shift or downshift the speed while the catching member is in the rest position.

The speed control device 100 has two operation modes. In one operation mode, i.e. the cable-winding operation as shown in FIGS. 9 through 12, the operation lever 44 of the second engaging mechanism 40 is pivoted from its control end 442, but not necessary, in the second rotation direction R2 to pivot the catching member 41 to abut against the control plate 42 via the first emboss 414 and then cause rotation of the control plate 42. As the control plate 42 is rotated, the first engaging mechanism 30 is rotated concurrently due to the engaging section 4722 of the pawl 472 of the clutch device 47 being engaged with the retaining toothed section 323 of the first toothed member 32. The engagement 43 is rotated via the second emboss 415, and as the engagement plate 43 is rotated, the first abutted section 2223 disengages from the first protrusion 432 of the engagement plate 43 and engages with a holding surface 2181 of the aperture 218. The holding surface 2181 of the aperture 218 and the center of the hole 431 is smaller than that of the first portion 4321 of the first protrusion 432 so that the first engaging section 2222 and the first toothed section 333 has a gap to prevent the second toothed member 33 from interfering with respect to the first engaging section 2222. In addition, the second engaging section 2322 of the second pawl 232 is shifted from a beginning position in which the second engaging section 2322 is engaged with a tooth of the second toothed section 334 to a first position in which the second engaging section 2322 is engaged with the next tooth if one speed change is to be made. The first engaging mechanism 30 is abutted by the second pawl 232 and the biasing member 35, respectively, so that the first engaging member 30 is prevented from rotating with respect to the first shaft 214.

Next, the operation lever 44 is returned to its home position, i.e. an initial position where the operation lever 44 is positioned before commencing this cable-winding operation (as shown in FIG. 6). The control plate 42 is rotated in the first rotation direction R1 by the biasing member 48, and the abutted surface 4221 abuts the first emboss 414 of the catching member 41 to rotate the catching member 41 in the first rotation direction R1 such that the engaging section 4722 of the pawl is shifted from a beginning position in which the engaging section 4722 is engaged with a root in the retaining toothed section 323 of the first toothed member 32 to a first engaging position in which engaging section 4722 is engaged with the next root. The second emboss 415 of the catching member 41 abuts the abutted surface 434 of the engagement plate 43 such that the engagement plate 43 is rotated in the first rotation direction R1 until the operation lever 44 is returned to its home position. The first portion 4321 of the first protrusion 432 abuts the first abutted section 2223 of the first pawl 222, and the first portion 4331 of the second protrusion 433 abuts the second abutted section 2323 of the second pawl 232 while the operation lever 44 is in its home position.

Additionally, the control assembly 2 is adapted to effect multiple speed changes in one stroke of the operation lever 44 of the second engaging mechanism 40. The body 21 has a retaining surface 21b formed thereon and adjacent to the block 21a. The operation lever 44 is able to be pivoted in the second rotation direction. R2 from the home position to a maximum pivotal position with the engaging section 4722 of the pawl 472 abutting the retaining surface 21b of the body 21 to prevent the second engaging mechanism 40 from further rotating in the second rotation direction R2. FIGS. 13 through 17 show that the operation lever 44 is pivoted to the maximum pivotal position in the second rotation direction R2 to pivot the catching member 41 to abut against the control plate 42 via the first emboss 414 and then cause rotation of the control plate 42. As the control plate 42 is rotated, the first engaging mechanism 30 is rotated concurrently due to the pawl 472 of the clutch device 47 being engaged with the retaining toothed section 323 of the first toothed member 32. Preferably, the control assembly 2 is able to effect three speed changes in one stroke of the operation lever 44 while the operation lever 44 is pivoted to the maximum pivotal position in which the second engaging section 2322 of the second pawl 232 is shifted from the beginning position to a second position in which the second engaging section 2322 skips across three teeth and is engaged with the last teeth if a three speed change is to be made. The first engaging mechanism 30 is abutted by the second pawl 232 and the biasing member 35, respectively, so that the first engaging member 30 is prevented from rotating with respect to the first shaft 214.

Next, the operation lever 44 is returned to its home position, the control plate 42 is rotated in the first rotation direction R1 by the biasing member 48, and the abutted surface 4221 abuts the first emboss 414 of the catching member 41 to rotate the catching member 41 in the first rotation direction R1 such that the engaging section 4722 of the pawl is shifted from a beginning position to a second engaging position in which engaging section 4722 skip across three roots and is engaged with the last root. The second emboss 415 of the catching member 41 abuts the abutted surface 434 of the engagement plate 43. Thus, the engagement plate 43 is rotated in the first rotation direction R1 until the operation lever 44 is returned to its home position.

In another operation mode, i.e. the cable-releasing operation, as shown in FIGS. 18 through 23, the operation lever 44 of the second engaging mechanism 40 is pivoted in the first rotation direction R1 for the cable-winding operation and is then released to accomplish the cable-releasing. Specifically, the operation lever 44 is pivoted from its control end 442 in the first rotation direction R1 to pivot the catching member 41 to abut against the engagement plate 43 via the second emboss 415 and then cause rotation of the engagement plate 43. The control plate 42 is rotated in the first rotation direction R1 by the biasing member 48, and the engaging surface 4723 of the pawl 472 is abutted by the block 21a of the body 21 so that the engaging section 4722 of the pawl 472 is disengaged from the retaining toothed section 323 of the first toothed member 32. As the engagement plate 43 is rotated, the first protrusion 432 of the engagement plate 43 slides with respect to the first abutted section 2223 until the first abutted section 2223 engages with the second portion 4322 of the first protrusion 432, and the second protrusion 433 of the engagement plate 43 slides with respect to the second abutted section 2323 until the second abutted section 2323 engages with the second portion 4332 of the second protrusion 433. The second engaging section 2322 is disengaged from the second toothed section 334 of the second toothed member 33 while the second abutted section 2323 engages with the second portion 4322 of the first protrusion 432. In addition, the first engaging section 2222 is engaged with a corresponding tooth of the first toothed section 333 of the second toothed member 33 while the first abutted section 2223 engages with the second portion 4322 of the first protrusion 432. Moreover, because the first and second toothed sections 333 and 334 have a phase shift therebetween, once the second engaging section 2322 is disengaged from the second toothed section 334 of the second toothed member 33, the first engaging section 2222 is engaged with the corresponding tooth of the first toothed section 333 of the second toothed member 33 immediately, and the second toothed member 33 is rotated with a first angular step A in the first rotation direction R1 via the biasing member 35, simultaneously. Then, the second engaging section 2322 corresponds to a next tooth of the second toothed section 334 of the second toothed member 33.

Next, the operation lever 44 is returned to its home position, the engagement plate 43 is rotated in the second rotation direction R2 by the biasing member 49, and the abutted surface 434 abuts the second emboss 415 of the catching member 41 to rotate the catching member 41 in the second rotation direction R2. Thus, the first protrusion 432 of the engagement plate 43 slides with respect to the first abutted section 2223 until the first abutted section 2223 engages with the first portion 4321 of the first protrusion 432, and the second protrusion 433 of the engagement plate 43 slides with respect to the second abutted section 2323 until the second abutted section 2323 engages with the first portion 4331 of the second protrusion 433. The first engaging section 2222 is disengaged from the corresponding tooth of the first toothed section 333 of the second toothed member 33, while the first abutted section 2223 engages with the first portion 4321 of the first protrusion 432. In addition, the second engaging section 2322 is engaged with the next tooth of the second toothed section 334 of the second toothed member 33, while the second abutted section 2323 engages with the first second portion 4322 of the first protrusion 432. Moreover, because the first and second toothed sections 333 and 334 have a phase shift therebetween, once the first engaging section 2222 is disengaged from the corresponding tooth of the first toothed section 333 of the second toothed member 33, the second engaging section 2322 is engaged with the next tooth of the second toothed section 334 of the second toothed member 33 immediately, and the second toothed member 33 is rotated with a second angular step B in the first rotation direction R1 via the biasing member 35, simultaneously. Then, the first engaging section 2222 corresponds to a next tooth of the first toothed section 333 of the second toothed member 33 if one speed change is to be made. As the catching member 41 rotates in the second rotation direction R2, the control plate 42 is rotated in the second rotation direction R2 due to the abutted surface 4221 being abutted by the first emboss 414 of the catching member 41 until the operation lever is back to the home position, such that the engaging section 4722 of the pawl 472 is engaged to a corresponding tooth of the retaining toothed section 323 of the first toothed member 32.

Figure 25:
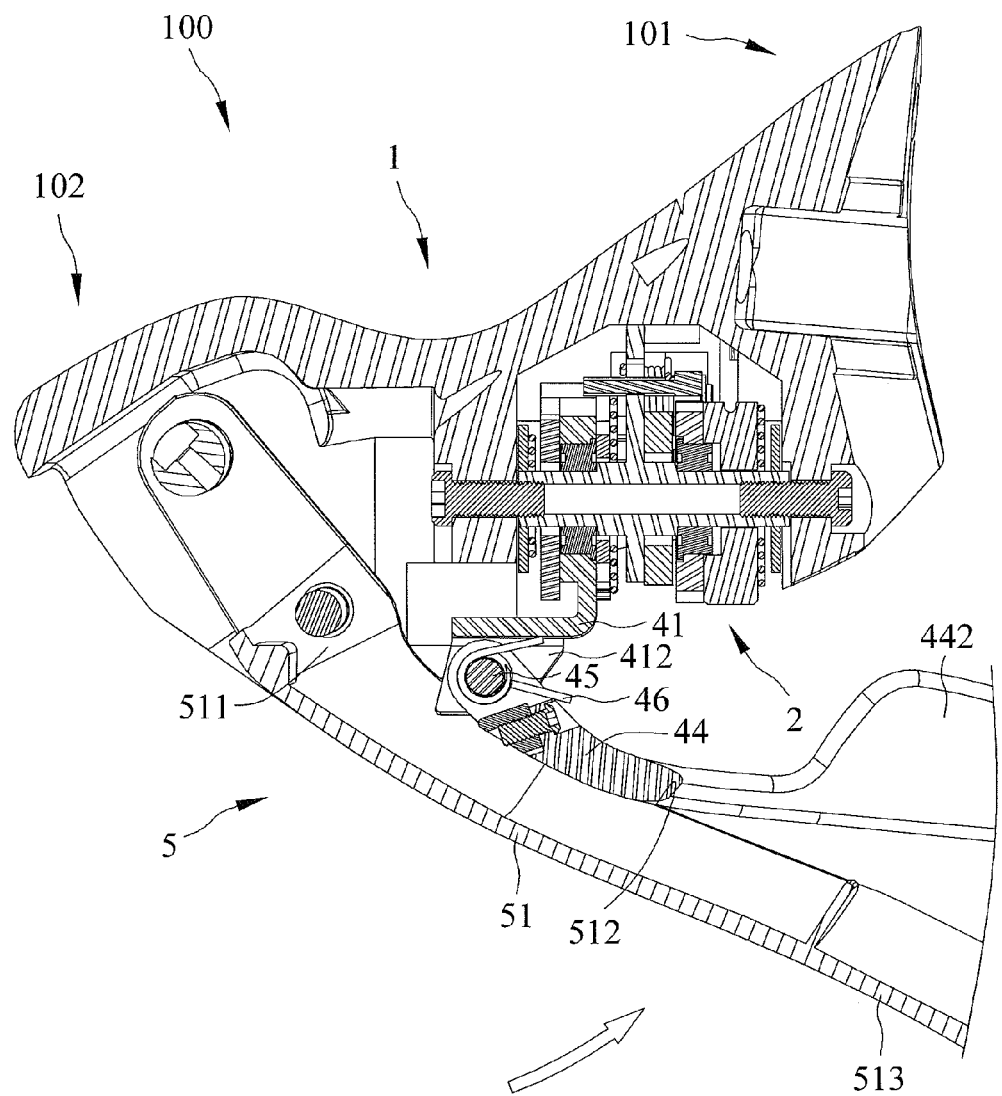
FIG. 25 is an extended view of FIG. 24 and shows a brake lever pivoted toward a first end of a housing.

The operation lever 44 is biased by the biasing element 46 as shown in FIG. 25. Preferably, the biasing element 46 is a torque spring and includes a plurality of coaxially disposed coiled sections inserted by the fastener 45, a first leg extending therefrom and engaging to the catching portion 412 of the catching member 41, and a second leg extending therefrom and connecting to the operation lever 44 so that the control end 442 is biased to be close to the brake assembly 5. The brake assembly 5 comprises a brake lever 51 including a pivotal portion 511 formed on one end thereof, a stop wall 512 corresponding to the operation lever 44, and a control end 513 formed on the other end thereof. The pivotal portion 511 is pivotally connected to the housing 1, and the control end 513 can be operated to pivot the brake lever 51, but not necessary. As the control end 513 of the brake lever 51 is pivoted toward the first end 101 of the housing 1, the control end 442 of the operation lever 44 is abutted to be biased to the first end 101 of the housing 1 by the stop wall 512 of the brake lever 51. As the control end of the brake lever 51 is pivoted to return to an initial position (not shown), the operation lever 44 is pivoted to its initial position by the biasing element 46 so that the operation lever 44 would not interfere with respect to the brake lever 51.

What is claimed is:

1. A speed control device operable between a cable-winding operation mode and a cable-releasing operation mode, comprising:
   a control assembly including a fixing member, a first engaging mechanism pivotally connected to the fixing member, and a second engaging mechanism pivotally connected to the fixing member;
   wherein the fixing member includes a body, a first pawl device selectively engaged with the first engaging mechanism, and a second pawl device selectively engaged with the first engaging mechanism, with the fixing member having a first connected portion where the first pawl device is disposed to, and a second connected portion where the second pawl device is disposed to;
   wherein the first engaging mechanism includes a cable-receiving member rotatable in a first rotation direction to up-shift a speed and a second rotation direction to down-shift the speed;
   wherein the second engaging mechanism includes a control plate, an engagement plate, and a clutching device, with the control plate having an arm portion, with the clutching device disposed to the arm portion of the control plate and selectively engaged with the first engaging mechanism, wherein the engagement plate includes a first protrusion and a second protrusion, which protrude from an outer periphery thereof, wherein the first and second protrusions correspond to the first pawl device and the second pawl device, respectively; and
   wherein the control assembly is adapted to effect a multiple speed change in one stroke of the second engaging mechanism, wherein the first pawl device includes a first engaging section and a first abutted section abutted by the first protrusion, wherein the second pawl device includes a second engaging section and a second abutted section abutted by the second protrusion, wherein the first engaging mechanism includes a first toothed section selectively engaged by the first engaging section, and a second toothed section selectively engaged by the second engaging section, wherein when the second engaging mechanism is not operated, the first engaging section is disengaged from the first toothed section, and the second engaging section is engaged with the second toothed section, wherein the engagement plate includes a hole extending therethrough, wherein the body includes a holding surface, wherein the holding surface and a center of the hole has a distance therebetween smaller than that of the first protrusion and the center of the hole, wherein the second engaging mechanism includes a catching member including a second emboss, wherein the engagement plate includes an abutted surface corresponding to the second emboss of the catching member, wherein as the catching member rotates in the second rotation direction, the engagement plate is rotated in the second rotation direction as the abutted surface is abutted by the second emboss of the catching member, and the first abutted section is disengaged from the first protrusion to engage the holding surface of the body.

2. The speed control device as claimed in claim 1, wherein the first protrusion has a first portion and a second portion, wherein the first portion and a center of the hole has a distance therebetween smaller than that between the second portion and the center of the hole, wherein with the first abutted section of the first pawl device abutted by the first portion of the first protrusion, the first engaging section of the first pawl device is disengaged from the first toothed section, wherein with the first abutted section of the first pawl device abutted by the second portion of the first protrusion, the first engaging section of the first pawl device is engaged with the first toothed section.

3. The speed control device as claimed in claim 1, wherein the second protrusion has a first portion and a second portion, wherein the first portion and a center of the hole has a distance therebetween smaller than that between the second portion and the center of the hole, wherein with the second abutted section of the second pawl device abutted by the first portion of the second protrusion, the second engaging section of the second pawl device is engaged with the second toothed section, wherein with the second abutted section of the second pawl device abutted by the second portion of the second protrusion, the second engaging section of the second pawl device is disengaged from the second toothed section.

4. The speed control device as claimed in claim 1, wherein each of the first toothed section and the second toothed section is formed on an outer periphery of the first engaging mechanism and includes a plurality of teeth, respectively, in which each tooth is asymmetric.

5. The speed control device as claimed in claim 1, wherein the first engaging mechanism includes a retaining toothed section formed on an outer periphery and including a plurality of teeth, wherein the clutching device has an engaging section formed on one end thereof, wherein with the second engaging mechanism pivoted in the second direction, the first engaging mechanism is rotated concurrently as the engaging section is engaged with the retaining toothed section to effect the multiple speed change.

6. The speed control device as claimed in claim 5, wherein the retaining toothed section is formed on the outer periphery of the first engaging mechanism and includes the plurality of teeth, respectively, in which each tooth is asymmetric.

7. The speed control device as claimed in claim 5, wherein the clutching device has an engaging surface formed on one end thereof, wherein the engaging surface corresponds to a block of the body, wherein with the second engaging mechanism pivoted in the first rotation direction for the cable-winding operation, the engaging surface is abutted by the block of the body with the engaging section of the clutching device disengaged from the retaining toothed section of the first engaging mechanism.

8. The speed control device as claimed in claim 5, wherein the body has a retaining surface formed thereon, wherein with the second engaging mechanism pivoted in the second rotation direction to a maximum pivotal position, the engaging section of the clutching device abuts the retaining surface of the body to prevent the second engaging mechanism from further rotating in the second rotation direction.

9. The speed control device as claimed in claim 1, wherein the fixing member includes a first retaining unit installed thereto, wherein the first engaging mechanism includes a biasing member including a proximal end engaging a limiting portion of the first retaining unit, and a distal end engaging to the first engaging mechanism.

10. The speed control device as claimed in claim 1, wherein the second engaging mechanism includes a biasing member having a proximal end engaging a limiting portion of the body, and a distal end engaging to the control plate.

11. The speed control device as claimed in claim 1, wherein the fixing member includes a second retaining unit installed thereto, wherein the second engaging mechanism includes a biasing member including a proximal end engaging to a limiting portion of the second retaining unit, and a distal end engaging the engagement plate.

12. The speed control device as claimed in claim 1, wherein the second engaging mechanism includes a catching member, a operation lever pivotally coupled to the catching member, and a biasing element disposed between the catching member and the operation lever, with the operation lever biased by the biasing element.

13. The speed control device as claimed in claim 1, wherein a plurality teeth of the first toothed section has an arrangement like that of a plurality of teeth of the second toothed section, wherein the first and second toothed sections have a phase shift therebetween.

14. The speed control device of claim 1, wherein the first and second engaging mechanisms are pivotally connected to the fixing member about an assembly axis; wherein the first and second pawl devices are pivotal relative to the fixing member about first and second, parallel, pivot axes parallel to the assembly axis; wherein the first and second protrusions protrude generally parallel to and spaced from the assembly axis; and wherein the first and second abutted sections extend parallel to and spaced from the first and second pivot axes respectively.

15. A speed control device operable between a cable-winding operation mode and a cable-releasing operation mode, comprising:
 a control assembly including a fixing member, a first engaging mechanism pivotally connected to the fixing member, and a second engaging mechanism pivotally connected to the fixing member;
 wherein the fixing member includes a body, a first pawl device selectively engaged with the first engaging mechanism, and a second pawl device selectively engaged with the first engaging mechanism, with the fixing member having a first connected portion where the first pawl device is disposed to, and a second connected portion where the second pawl device is disposed to;
 wherein the first engaging mechanism includes a cable-receiving member rotatable in a first rotation direction to up-shift a speed and a second rotation direction to down-shift the speed;
 wherein the second engaging mechanism includes a control plate, an engagement plate, and a clutching device, with the control plate having an arm portion, with the clutching device disposed to the arm portion of the control plate and selectively engaged with the first engaging mechanism, wherein the engagement plate includes a first protrusion and a second protrusion, which protrude from an outer periphery thereof, wherein the first and second protrusions correspond to the first pawl device and the second pawl device, respectively; and
 wherein the control assembly is adapted to effect a multiple speed change in one stroke of the second engaging mechanism, wherein the second engaging mechanism includes a catching member having a first emboss formed thereon, wherein the control plate includes an abutted surface corresponding to the first emboss of the catching member, wherein as the catching member rotates in the second rotation direction, the control plate is rotated in the second rotation direction as the abutted surface is abutted by the first emboss of the catching member.

16. The speed control device as claimed in claim 15, wherein the first engaging mechanism includes a first toothed section, wherein the first pawl device includes a first pawl and a first biasing element, wherein the first pawl has a first engaging section formed on one end thereof, and a first abutted section formed on the other end thereof, wherein the first biasing element includes a first leg extending therefrom and connecting to the first abutted section of the first pawl, and a second leg extending therefrom and connecting to the body with the first engaging section biased to disengage from the first toothed section.

17. The speed control device as claimed in claim 15, wherein the first engaging mechanism includes a second toothed section, wherein the second pawl device includes a second pawl and a second biasing element, wherein the second pawl has a second engaging section formed on one end thereof, and a second abutted section formed on the other end thereof, wherein the second biasing element includes a first leg extending therefrom and connecting to the second abutted section of the second pawl, and a second leg extending therefrom and connecting to the body with the second engaging section biased to engage with the second toothed section.

18. A speed control device operable between a cable-winding operation mode and a cable-releasing operation mode, comprising:
- a control assembly including a fixing member, a first engaging mechanism pivotally connected to the fixing member, and a second engaging mechanism pivotally connected to the fixing member;
- wherein the fixing member includes a body, a first pawl device selectively engaged with the first engaging mechanism, and a second pawl device selectively engaged with the first engaging mechanism, with the fixing member having a first connected portion where the first pawl device is disposed to, and a second connected portion where the second pawl device is disposed to;
- wherein the first engaging mechanism includes a cable-receiving member rotatable in a first rotation direction to up-shift a speed and a second rotation direction to down-shift the speed;
- wherein the second engaging mechanism includes a control plate, an engagement plate, and a clutching device, with the control plate having an arm portion, with the clutching device disposed to the arm portion of the control plate and selectively engaged with the first engaging mechanism, wherein the engagement plate includes a first protrusion and a second protrusion, which protrude from an outer periphery thereof, wherein the first and second protrusions correspond to the first pawl device and the second pawl device, respectively; and
- wherein the control assembly is adapted to effect a multiple speed change in one stroke of the second engaging mechanism, wherein the second engaging mechanism includes a catching member having a second emboss formed thereon, wherein the engagement plate includes an abutted surface corresponding to the second emboss of the catching member, wherein as the catching member rotates in the first rotation direction, the engagement plate is rotated in the first rotation direction as the abutted surface is abutted by the second emboss of the catching member.

* * * * *